(12) United States Patent
Racz et al.

(10) Patent No.: US 8,579,169 B2
(45) Date of Patent: Nov. 12, 2013

(54) MOUNTING ASSEMBLY FOR A VEHICLE ACCESSORY

(75) Inventors: Joseph Andrew Racz, Gastonia, NC (US); Bryce Thomas Metcalf, Huntersville, NC (US)

(73) Assignee: Indian Motorcycle Company, Kings Mountain, NC (US)

( * ) Notice: Subject to any disclaimer, the term of this patent is extended or adjusted under 35 U.S.C. 154(b) by 970 days.

(21) Appl. No.: 12/497,960

(22) Filed: Jul. 6, 2009

(65) Prior Publication Data

US 2010/0025443 A1    Feb. 4, 2010

Related U.S. Application Data

(60) Provisional application No. 61/085,313, filed on Jul. 31, 2008.

(51) Int. Cl.
*B62J 7/00* (2006.01)
*B62J 11/00* (2006.01)

(52) U.S. Cl.
USPC ........... 224/413; 224/423; 224/441; 224/447; 224/431; 224/430; 280/202

(58) Field of Classification Search
USPC ......... 224/413, 423, 441, 447, 431, 430, 271; 280/202; 248/222.11; 410/104, 105
See application file for complete search history.

(56) References Cited

U.S. PATENT DOCUMENTS 3,625,405 A * 12/1971 Kezar et al. .................. 224/413
4,096,980 A * 6/1978 Clow ........................... 224/441

(Continued)

FOREIGN PATENT DOCUMENTS

| EP | 0 709 | 1/1996 |
|---|---|---|
| JP | 9076964 | 3/1997 |
| TW | 242445 | 9/1992 |

OTHER PUBLICATIONS

Harley-Davidson Motor Company Instructions, DYNA Bobtail Fender Kit (Kit No. 69710-06) Rev. Nov. 15, 2005; 4 pages.

(Continued)

*Primary Examiner* — Nathan J Newhouse
*Assistant Examiner* — Lester L Vanterpool
(74) *Attorney, Agent, or Firm* — Faegre Baker Daniels LLP

(57) ABSTRACT

A mounting system for removably mounting an accessory on a fender of a motorcycle includes a mounting bracket, mounting tab, and latch. The mounting bracket is configured to be mounted on the fender. The mounting bracket includes a base plate, cover plate, standoff, mounting slot, upper recess and lower recess. The base plate is disposed upon the fender. The cover plate is configured to cover a portion of the base plate. The standoff is sandwiched between the base plate and the cover plate. The mounting slot is disposed between the base plate and the cover plate. The mounting slot is generated by the standoff being disposed between the base plate and cover plate. The upper recess is disposed at an upper edge of the mounting bracket between the base plate and the cover plate. The lower recess is disposed at a lower edge of the mounting bracket between the base plate and the cover plate. The mounting tab is configured to mate with the mounting slot. The mounting tab is affixed to a first accessory. The latch is affixed to a second accessory. The latch includes an upper jaw configured to mate with the upper recess and a lower jaw configured to mate with the lower recess.

11 Claims, 23 Drawing Sheets

(56) References Cited

U.S. PATENT DOCUMENTS

| | | | |
|---|---|---|---|
| 4,993,731 A * | 2/1991 | Fuller | 280/202 |
| 5,299,832 A | 4/1994 | Price, Sr. | |
| 5,558,260 A | 9/1996 | Reichert | |
| 5,664,715 A * | 9/1997 | Gogan et al. | 224/413 |
| 5,667,232 A * | 9/1997 | Gogan et al. | 280/202 |
| 5,732,965 A | 3/1998 | Willey | |
| 5,779,303 A | 7/1998 | Kuelbs et al. | |
| 5,931,360 A * | 8/1999 | Reichert | 224/413 |
| 6,053,384 A | 4/2000 | Bachman | |
| 6,135,473 A | 10/2000 | Wright | |
| 6,293,450 B1 * | 9/2001 | Aron | 224/430 |
| 6,347,804 B1 * | 2/2002 | Seibel | 280/288.4 |
| 6,378,643 B1 * | 4/2002 | Galbraith et al. | 180/219 |
| 6,390,220 B1 | 5/2002 | Galbraith et al. | |
| 6,443,344 B1 * | 9/2002 | Nicosia et al. | 224/413 |
| 6,484,914 B1 * | 11/2002 | Willey | 224/413 |
| 6,520,275 B2 | 2/2003 | Galbraith et al. | |
| 6,817,501 B1 | 11/2004 | Rogers et al. | |
| 6,820,782 B1 | 11/2004 | Monson | |
| 6,966,471 B1 * | 11/2005 | Wilson et al. | 224/413 |
| 7,021,708 B2 | 4/2006 | Renner | |
| 7,036,837 B1 * | 5/2006 | Bauer et al. | 280/288.4 |
| 7,150,382 B2 | 12/2006 | Zickefoose | |
| 7,311,232 B2 | 12/2007 | Watanabe et al. | |
| D597,921 S | 8/2009 | Krug | |
| 7,571,921 B1 | 8/2009 | Hoeve | |
| 7,654,496 B2 * | 2/2010 | Sharpe et al. | 248/222.11 |
| 8,172,188 B2 * | 5/2012 | Dubinskiy et al. | 248/214 |
| 2002/0005421 A1 * | 1/2002 | Campbell | 224/430 |
| 2004/0149792 A1 * | 8/2004 | Akita et al. | 224/413 |
| 2005/0062278 A1 | 3/2005 | Griffin et al. | |
| 2005/0134098 A1 | 6/2005 | MacKeben | |
| 2005/0150921 A1 * | 7/2005 | Schneider | 224/413 |
| 2006/0163302 A1 | 7/2006 | Knoch et al. | |
| 2006/0243770 A1 | 11/2006 | Kortbein et al. | |
| 2008/0084590 A1 | 4/2008 | Mack | |
| 2009/0001114 A1 | 1/2009 | Sonnetag et al. | |
| 2009/0152423 A1 * | 6/2009 | Dubinskiy et al. | 248/274.1 |
| 2010/0243691 A1 | 9/2010 | Salisbury | |

OTHER PUBLICATIONS

Ron Ayers Motorsports, Honda, 2006, VTX1800N3, Rear Febder Grab Rail (2); http://www.ronayers.com/Fische/TypeID/26/Type/REAR_FENDER_GRAB_RAIL_(2)/MakeID/1/Make/Honda/YearID/47/Year/2006/ModelID/5193/Model/VTX1800N3/GroupID/189052/REAR_FENDER__GRAB_RAIL_(2); Retreived Nov. 8, 2010; 5 pages.

* cited by examiner

MOUNTING ASSEMBLY FOR A VEHICLE ACCESSORY

CROSS REFERENCE TO RELATED APPLICATIONS

This application claims priority to U.S. Provisional Patent Application Ser. No. 61/085,313, filed on Jul. 31, 2008, entitled "MOUNTING ASSEMBLY FOR A VEHICLE ACCESSORY," the disclosure of which is incorporated herein by reference in its entirety.

FIELD OF THE INVENTION

The disclosure generally relates to vehicles, and more particularly to a mounting assembly for mounting an accessory to a motorcycle.

BACKGROUND OF THE INVENTION

Vehicles such as motorcycles have various equipment options for accessorizing the vehicle. The equipment options may include short fenders, two-up seats, passenger backrest, luggage rack, windshield, and leather or hardcase saddlebags. The saddlebags, which provide storage compartments, generally attach to the motorcycle fender and/or frame. The saddlebags are arranged to couple to the motorcycle using a complex assortment of bolts and support plates which remain visible when the saddlebags are removed.

SUMMARY OF THE INVENTION

The foregoing needs are met, to a great extent, by the present invention, wherein in some embodiments a mounting assembly and system for accessorizing a vehicle is provided.

An embodiment of the present invention relates to a mounting system for removably mounting an accessory on a fender of a motorcycle. The mounting system includes a mounting bracket, mounting tab, and latch. The mounting bracket is configured to be mounted on the fender. The mounting bracket includes a base plate, cover plate, standoff, mounting slot, upper recess and lower recess. The base plate is disposed upon the fender. The cover plate is configured to cover a portion of the base plate. The standoff is sandwiched between the base plate and the cover plate. The mounting slot is disposed between the base plate and the cover plate. The mounting slot is generated by the standoff being disposed between the base plate and cover plate. The upper recess is disposed at an upper edge of the mounting bracket between the base plate and the cover plate. The lower recess is disposed at a lower edge of the mounting bracket between the base plate and the cover plate. The mounting tab is configured to mate with the mounting slot. The mounting tab is affixed to a first accessory. The latch is affixed to a second accessory. The latch includes an upper jaw configured to mate with the upper recess and a lower jaw configured to mate with the lower recess.

Another embodiment of the present invention pertains to a mounting bracket for removably mounting an accessory on a fender of a motorcycle. The mounting bracket includes a base plate, cover plate, standoff, mounting slot, upper recess and lower recess. The base plate is configured to be secured to the fender. The cover plate is configured to cover a portion of the base plate. The standoff is sandwiched between the base plate and the cover plate. The mounting slot is configured to receive a mounting tab of a first accessory. The mounting slot is disposed between the base plate and the cover plate. The mounting slot is generated by the standoff being disposed between the base plate and cover plate. The upper recess is configured to receive an upper jaw of a latch. The upper recess is disposed at an upper edge of the mounting bracket between the base plate and the cover plate. The lower recess is configured to receive a lower jaw of a latch. The lower recess is disposed at a lower edge of the mounting bracket between the base plate and the cover plate.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

According to an embodiment of the invention an accessory mounting assembly is provided for removably mounting an accessory onto a fender of a motorcycle, the fender of the motorcycle having an aesthetically designed visible surface that includes aesthetically designed decorative coloration and/or texture. The mounting assembly includes a mounting bracket configured to be mounted on the fender of the motorcycle, a cover element configured be mounted on the mounting bracket, and a motorcycle accessory. When the cover element is mounted on the mounting bracket, the mounting bracket is non-obtrusive or substantially not visible and a visible exterior surface of the cover element is aesthetically incorporated into the decorative coloration of the motorcycle fender. The motorcycle accessory includes a releasable locking mechanism configured to move between an open releasing position and a closed locking position. The motorcycle accessory is configured so that it can be mounted to an attachment structure of the mounting bracket and moved into the closed position thereof to releasably attach the motorcycle accessory to the mounting bracket. When the motorcycle accessory is attached to the mounting bracket, movement of the releasable locking mechanism into its open position enables the motorcycle accessory to be detached from the mounting bracket so that the cover element remains visible.

Figure 1:
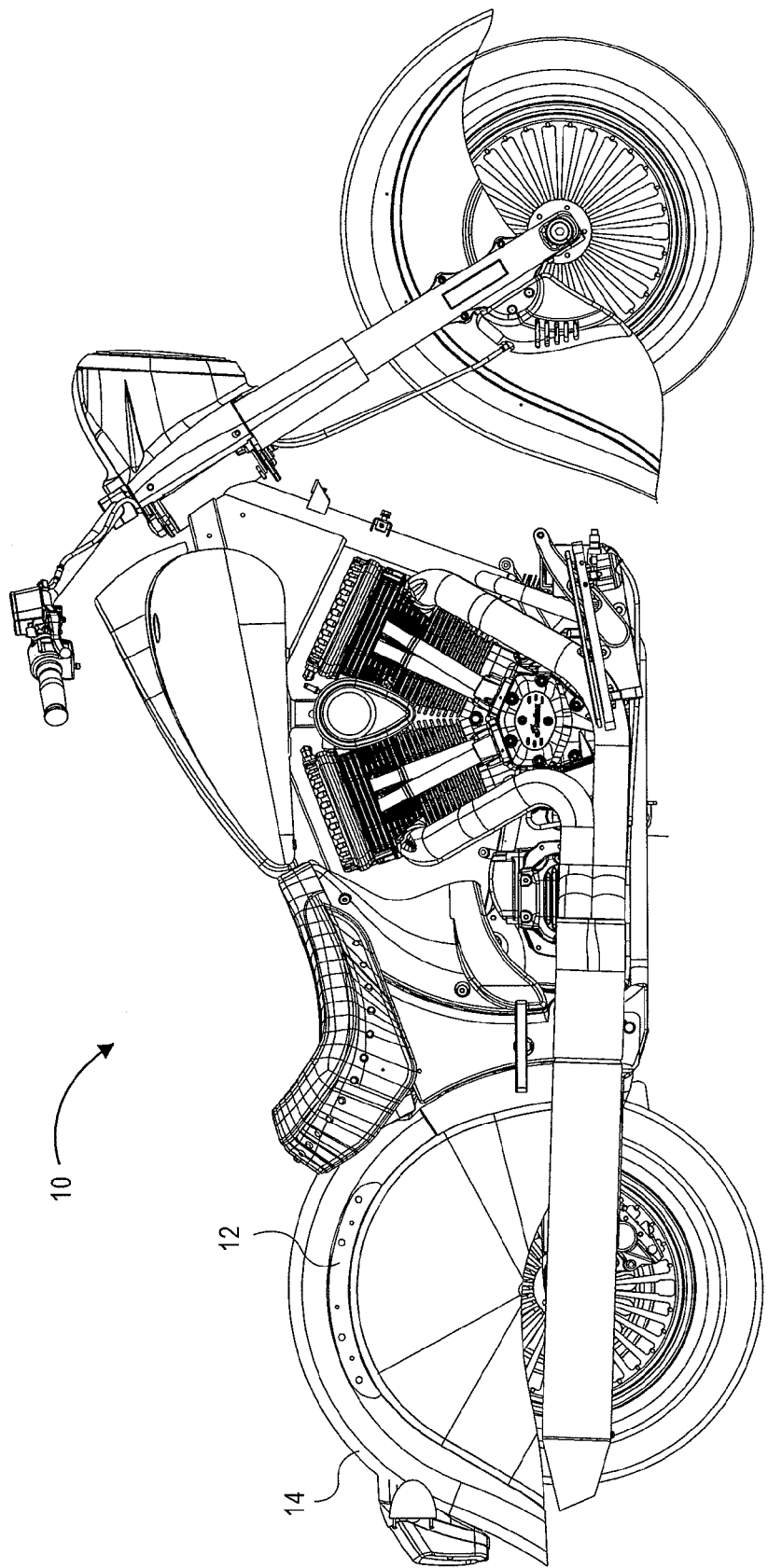
FIG. 1 is right side view of a motorcycle showing the stock condition of the motorcycle and showing a portion of an accessory mounting assembly.

The invention will now be described with reference to the drawing figures, in which like numerals refer to like parts throughout. FIG. 1 shows an example of a motorcycle 10 that is a suitable vehicle for a mounting bracket 12. The motorcycle 10 includes a rear fender portion or fender 14. The fender 14 has an aesthetic appearance that includes, for example, aesthetically designed visible surface, contour, coloration, and the like. For example, the fender 14 may be curved and/or cambered and may include a painted, metallic, and/or chrome portion. In addition, although particular example is made herein of the mounting bracket 12 being attached to the fender 14, it is within the scope of the invention that the mounting bracket 12 may be secured to other body components such as a fairing, subframe of the motorcycle 10, and/or the like.

The mounting bracket 12 is secured to the fender 14 and is configured to aesthetically integrate into styling elements of the fender 14 and/or motorcycle 10. The mounting bracket 12 is configured to provide mounting support for any suitable component or accessory. Examples of suitable components include saddlebags, back supports, luggage racks, decorative elements, and/or the like. The mounting bracket 12 is configured so that when mounted on the fender 14, the mounting bracket 12 is aesthetically incorporated into the decorative coloration of the fender 14. The aesthetic appearance of the motorcycle 10 together with the mounting bracket 12 is referred to as the stock condition of the vehicle. The mounting bracket 12 may include any suitable material such as, for example, polymers, composites, metallic material such as alloys of aluminum, steel, etc., and/or the like.

Figure 2:
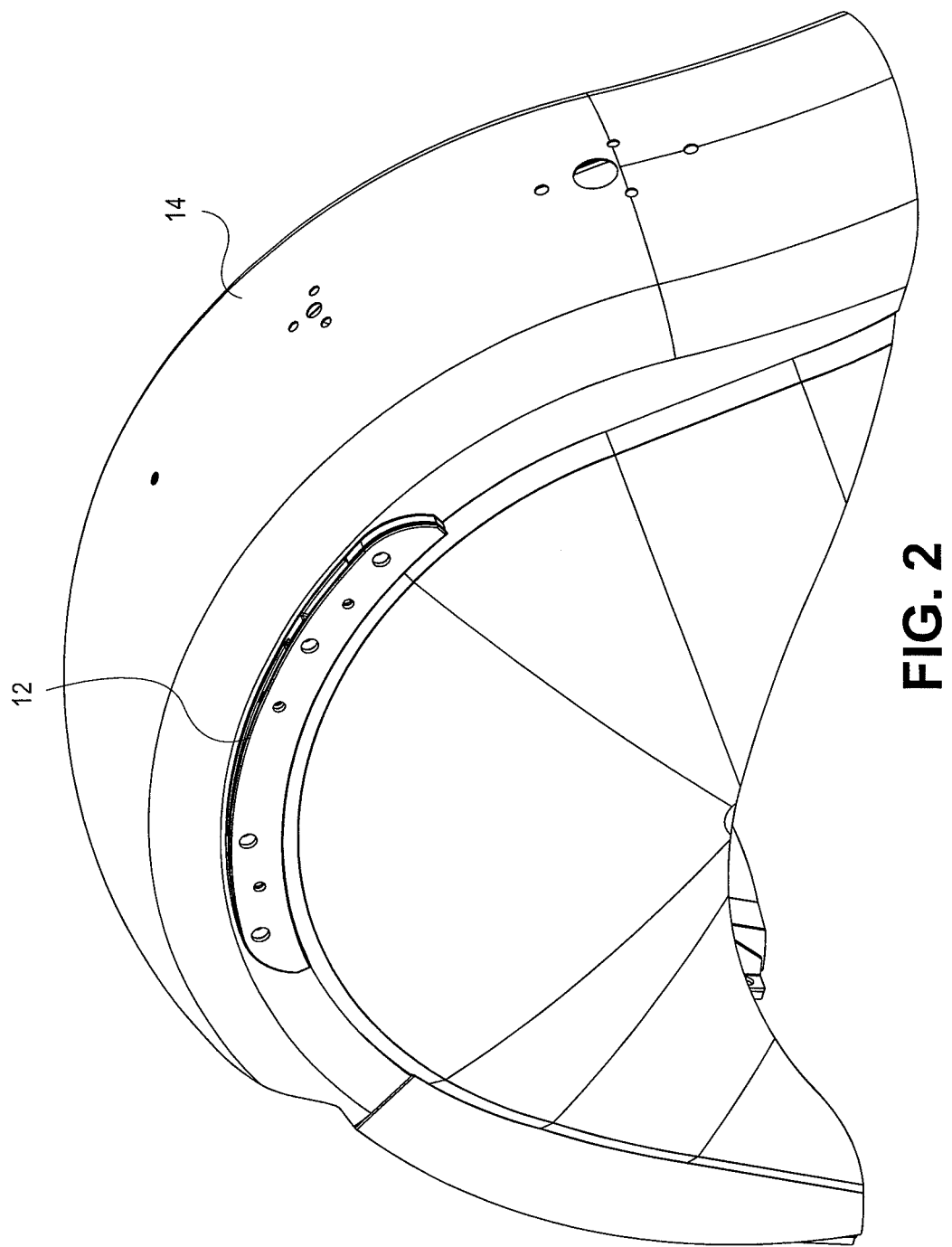
FIG. 2 is a perspective view of a fender with an assembled accessory mounting assembly attached thereto.

FIG. 2 is a perspective view of the fender 14 with the mounting bracket 12 attached thereto. As shown in FIG. 2, in one embodiment, the mounting bracket 12 generally follows the curve or contour of the fender 14.

Figure 3:
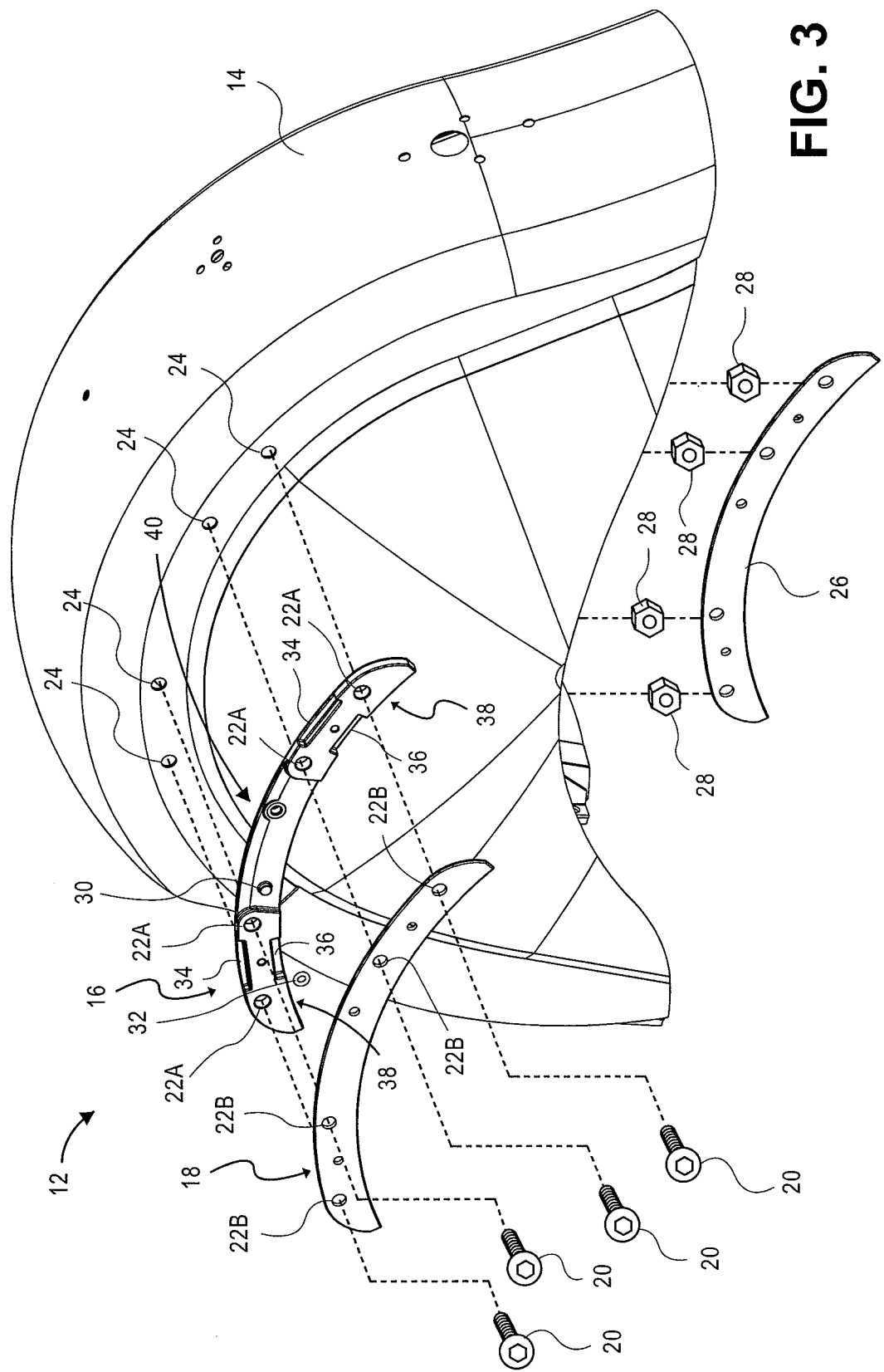
FIG. 3 is a perspective view showing an example of a mounting bracket and cover element in exploded relation to a fender of the motorcycle.

FIG. 3 is a perspective view showing an example of the mounting bracket 12 in exploded relation to the fender 14 of the motorcycle 10. As shown in FIG. 3, the mounting bracket 12 may include a base plate 16 and cover plate 18. However, in other examples, the mounting bracket 12 may be a unitary or monolithic structure or may include three or more plates or units. In the particular example shown, the bracket 12 is mounted to the fender 14 via fasteners 20 that pass through holes 22A and 22B. In various embodiments, the fasteners 20 may threadedly engage holes 24 and/or may pass through the holes 24 to threadedly engaged a backer plate 26, nuts 28, and/or threaded bores disposed in a subframe (not shown) of the motorcycle 10. In other examples, the mounting bracket 12 may be fixed or secured in any suitable manner such as, for examples, welded, riveted, or the like.

Also shown in FIG. 3, the mounting bracket 12 includes a mounting stud 30 and bushing 32. The mounting stud 30 is configured to provide an attachment point for various components as shown herein. The bushing 32 is configured to provide a flexible or compressive mounting and/or anti-vibration mounting. In this regard, the bushing 32 may include an elastomeric O-ring configured to be captured upon the mounting stud 30.

The mounting bracket 12 includes an upper recess 34 and lower recess 36 disposed in one or both of the base plate 16 and cover plate 18. In the particular example shown, the upper recess 34 and lower recess 36 are disposed in cooperative alignment on opposing sides of the mounting bracket 12. As described in greater detail herein, the upper and lower recesses 34/36 facilitate the use of a latch. In the example shown in FIG. 3, the upper and lower recesses 34/36 are disposed in a pair of pads or standoffs 38. These standoffs 38 are disposed at opposing ends of the mounting bracket 12 and sandwiched between the base plate 16 and the cover plate 18 to generate a gap or mounting slot 40.

Figure 4:
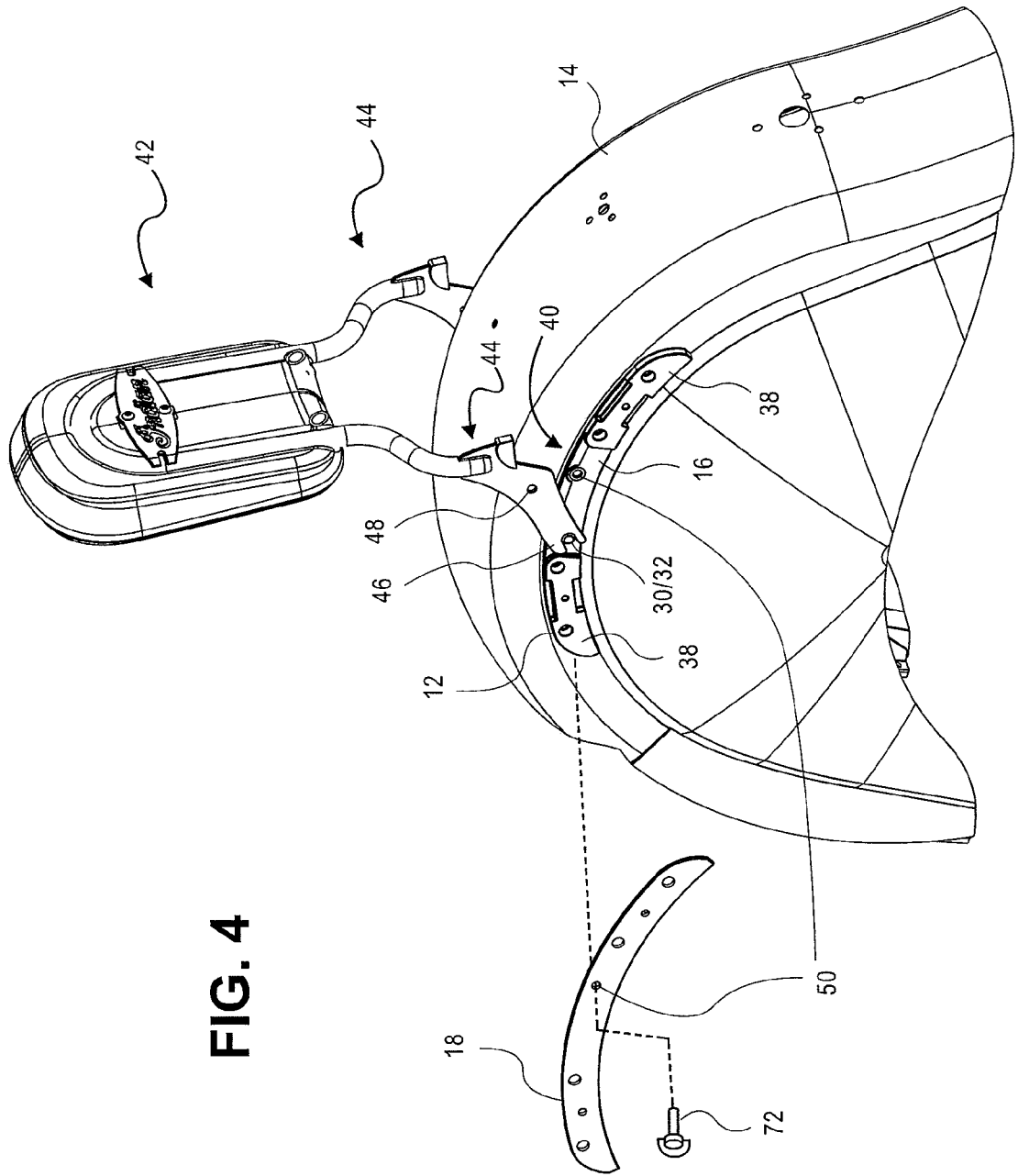
FIG. 4 is a perspective view showing an example of a backrest partially installed in the mounting bracket.

FIG. 4 is a perspective view showing an example of a backrest 42 partially installed in the mounting bracket 12 (Note the cover plate 18 has been removed from the base plate 16 for clarity). As shown in FIG. 4, the backrest 42 includes a mounting tab 44 configured to mate with the mounting slot 40. In this regard, a width of the mounting tab 44 is preferably essentially the same or slightly less than the width of the mounting slot 40.

The mounting tab 44 may include a bridle or fork 46 configured to engage the mounting stud 30 and/or bushing 32. To install the backrest 42 or any other suitable component having the mounting tab 44, the fork 46 is inserted into the mounting slot 40 and positioned to straddle or otherwise engage the mounting stud 30 and/or bushing 32. Subsequently, the mounting tab 44 may be pivoted upon the mounting stud 30 and rotated towards the mounting bracket 12.

Also shown in FIG. 4, the mounting tab 44 includes a retaining pin hole 48 in cooperative alignment with a retaining pin hole 50 that passes through the cover plate 18 and base plate 16. As shown herein, upon assembly, a retaining pin 52 may be inserted through the retaining pin hole 50 and 48 to detachably secure the mounting tab 44 relative to the mounting bracket 12.

Figure 5:
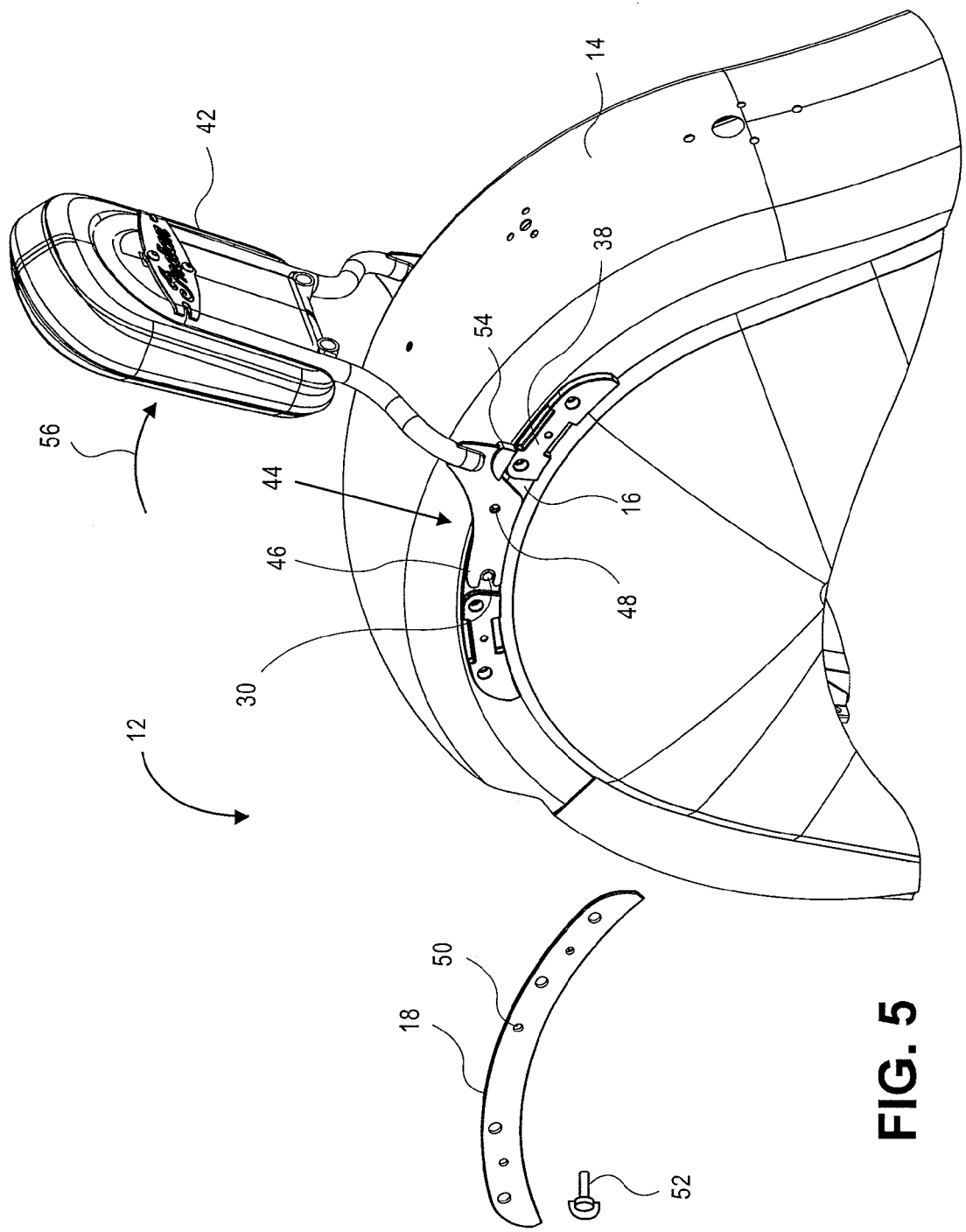
FIG. 5 is a perspective view showing an example of the backrest partially installed in the mounting bracket.

FIG. 5 is a perspective view showing an example of the backrest 42 partially installed in the mounting bracket 12 (Note the cover plate 18 has been removed from the base plate 16 for clarity). As shown in FIG. 5, as compared to FIG. 4, the backrest 42 has been rotated to dispose a compression spring 54 upon the standoff 38. The compression spring 54 may include any suitable resilient material or device. In a particular example, the compression spring 54 may be an elastomeric polymer. It is an advantage of this embodiment that the compression spring 54 in concert with the retaining pin 52 and mounting stud 30 and/or bushing 32 may provide a dynamic compressive tension configured to reduce or eliminate vibration. That is, by maintaining an amount of tension between the mounting bracket 12 and the mounting tab 44, noise generated by vibration conveyed from the fender 14 to the backrest 42 may be reduced or eliminated. It is a further advantage of this embodiment, that the elastomeric polymer of the compression spring 54 may be configured to absorb a portion or all of the vibration conveyed from the fender 14 to the backrest 42. In this manner, a person in contact with the backrest 42 may experience a reduced or no amount of vibration.

To generate the compressive tension, the backrest 42 may be urged in a direction 56. In response to urging the backrest 42 in direction 56, a load is applied to the compression spring 54 and, due to the shape configuration and/or material characteristics of the compression spring 54, a height of the compression spring 54 is reduced from an initial height to a reduced height. As the compression spring 54 is reduced to the reduced height, the mounting tab 44 continues to rotate about the mounting stud 30 from a relaxed conformation to a sprung conformation. In an embodiment, the retaining holes 48 and 50 are disposed such that alignment is achieved in response to the mounting tab 44 being in the sprung conformation.

Figure 6:
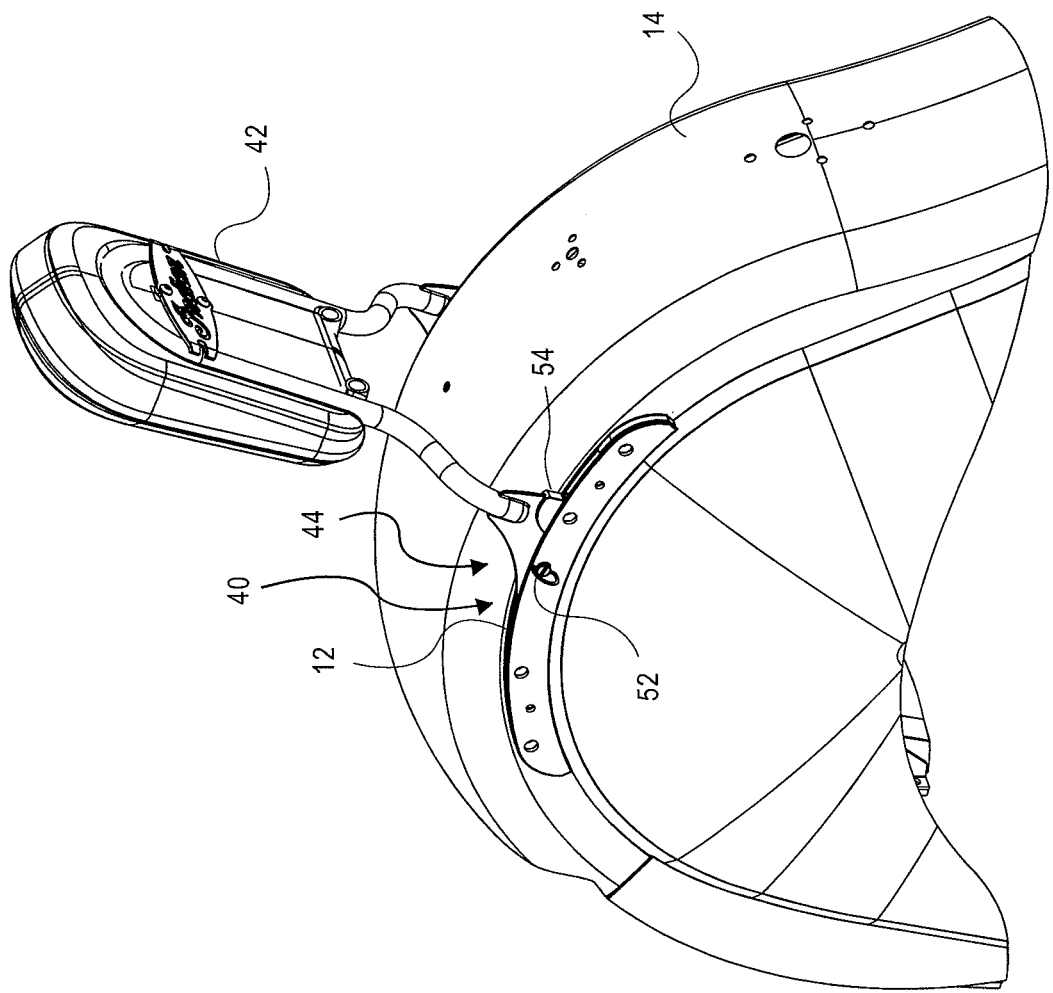
FIG. 6 is a perspective view showing an example of the backrest installed in the mounting bracket.

FIG. 6 is a perspective view showing an example of the backrest 42 installed in the mounting bracket 12. As shown in FIG. 6, the backrest 42 is releasably secured to the mounting bracket 12 via the retaining pin 52. More particularly, the mounting tab 44 is disposed within the mounting slot 40 and releasably secured therein via the retaining pin 52

Figure 7:
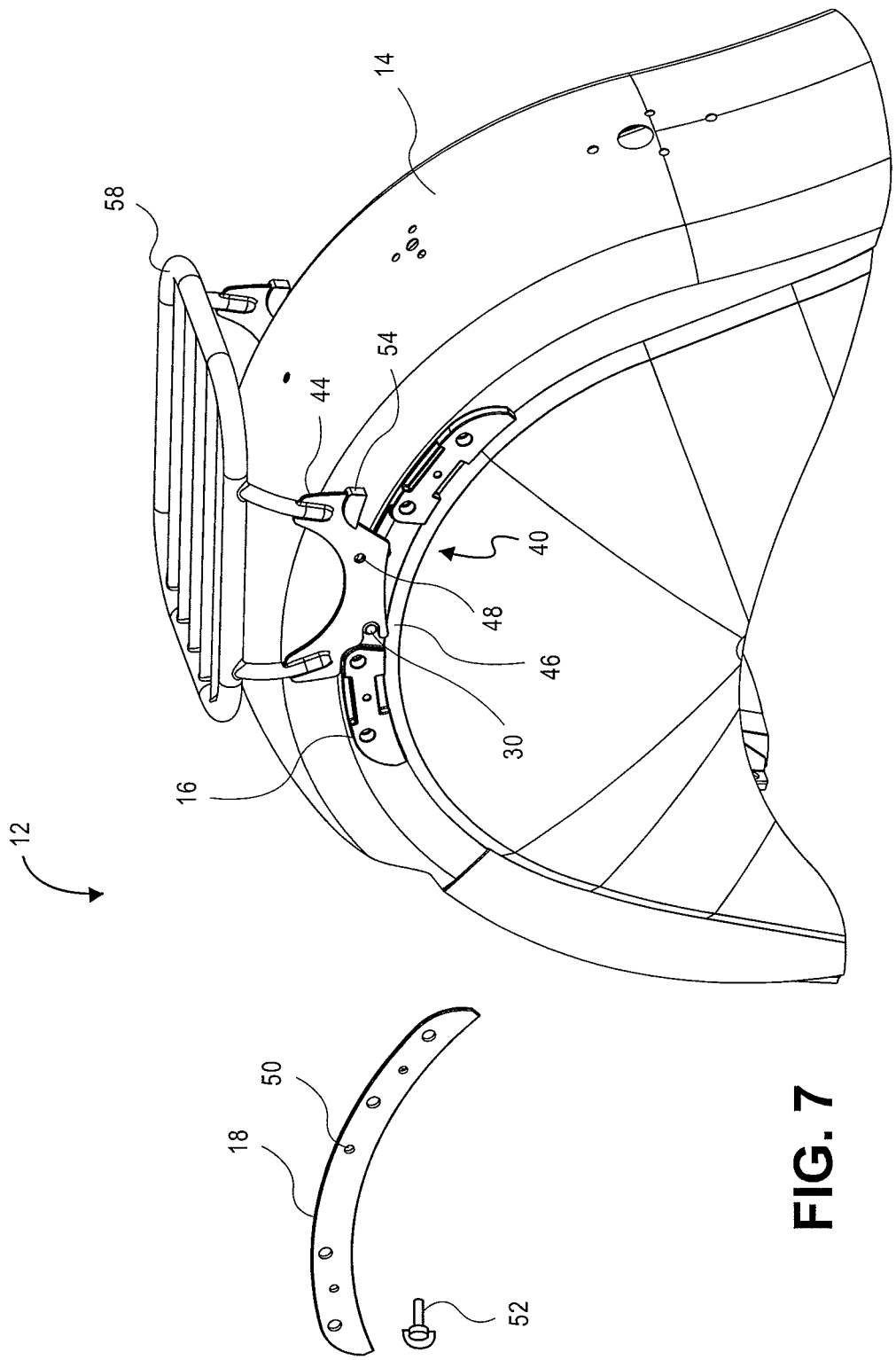
FIG. 7 is a perspective view showing an example of a luggage rack partially installed in the mounting bracket.

FIG. 7 is a perspective view showing an example of a luggage rack 58 partially installed in the mounting bracket 12. The luggage rack 58 is mounted to the mounting bracket 12 in a similar manner as compared to the backrest 42 and may include some of the same or similar components and thus, for the purpose of brevity, those items already described herein above, will not be described herein again. As shown in FIG. 7, the luggage rack 58 also includes a mounting tab 44 with a fork 46 configured to engage the mounting stud 30. Again, the cover plate 18 has been removed for clarity to show the mounting tab 44 being configured to fit within the mounting slot 40. However, in actual practice, the luggage rack or any other suitable component with a mounting tab 44 may be configured to mate with the mounting slot 40 without the removal of the cover plate 18.

Figure 8:
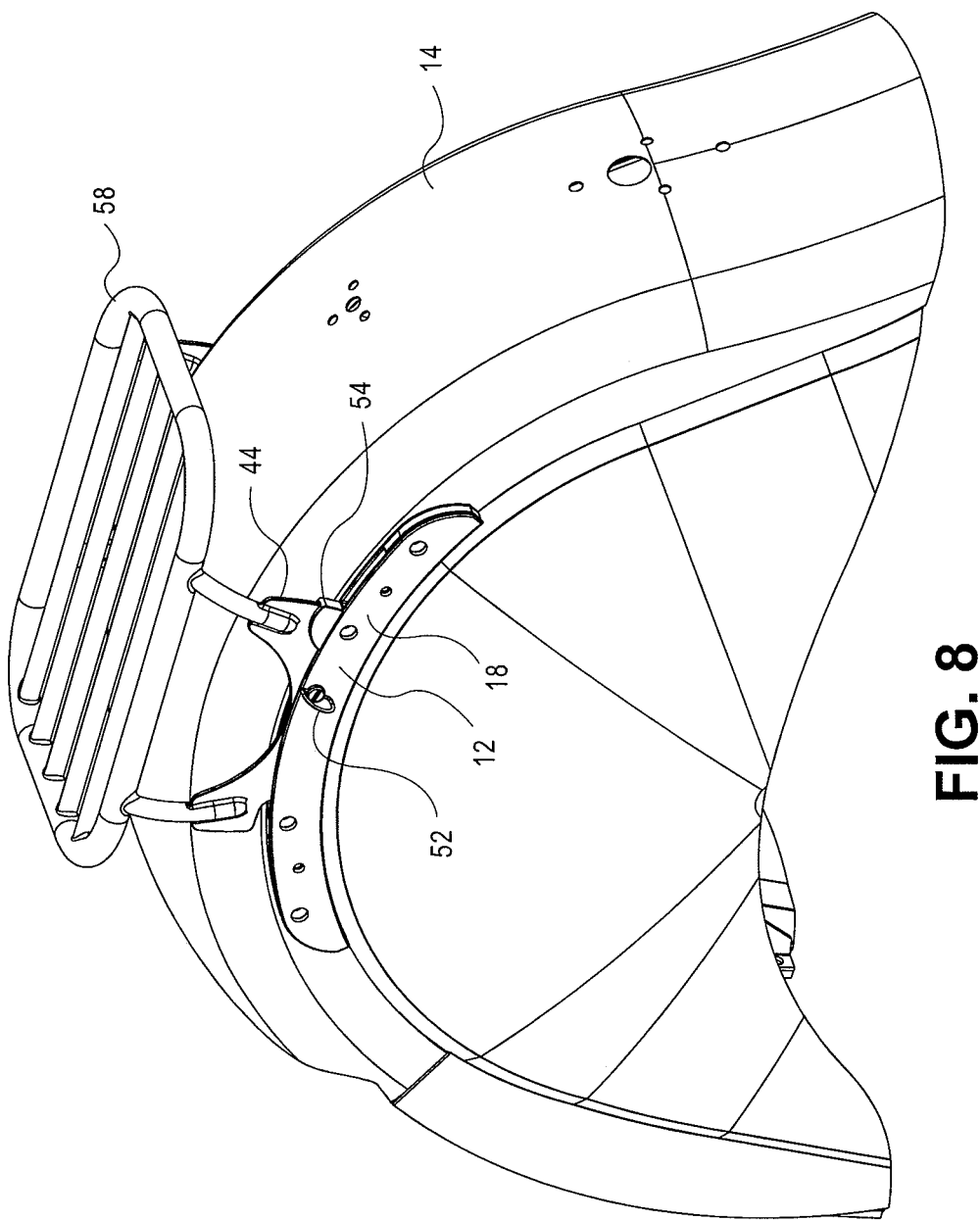
FIG. 8 is a perspective view showing an example of the luggage rack installed in the mounting bracket.

FIG. 8 is a perspective view showing an example of the luggage rack 58 installed in the mounting bracket 12. As shown in FIG. 8, the luggage rack 58 is releasably secured to the mounting bracket 12. Of note, access to the cover plate 18 is unimpeded by the luggage rack 58. As shown herein, this unrestricted access to the cover plate 18 facilitates attachment of additional accessories.

Figure 9:
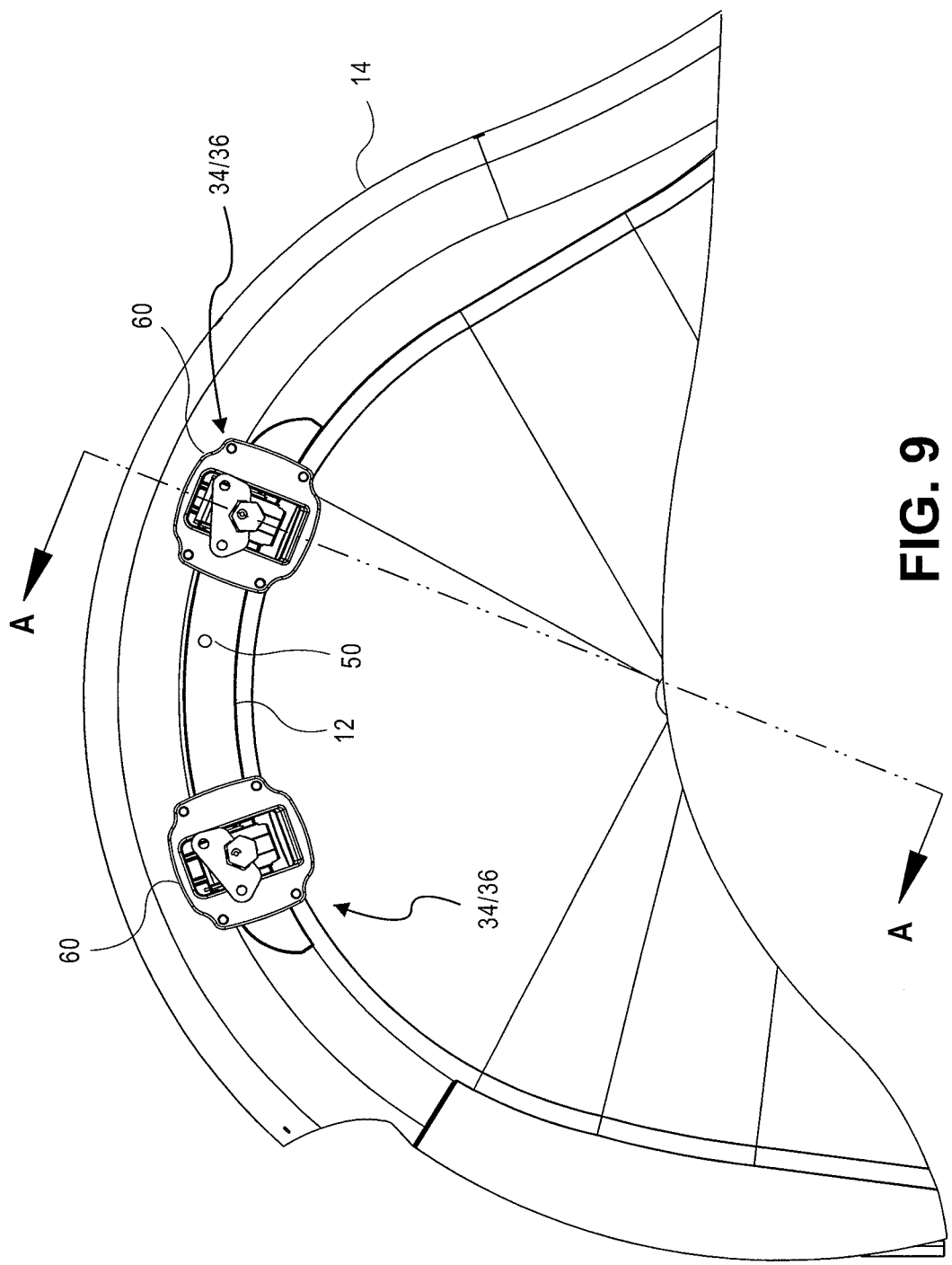
FIG. 9 is a side view of a latch for releasably securing suitable accessories to the mounting bracket.

FIG. 9 is a side view of a latch 60 for releasably securing suitable accessories to the mounting bracket 12. As shown in FIG. 9, the latch 60 is configured to engage the mounting bracket 12 at the upper and lower recesses 34/36 (See FIG. 3). In the particular example shown in FIG. 9, the mounting bracket 12 is configured to accept two of the latches 60. However, in other examples, the mounting bracket 12 may be configured to accept one, three, four, or more latches 60 and at various locations on the mounting brackets 12.

Figure 10:
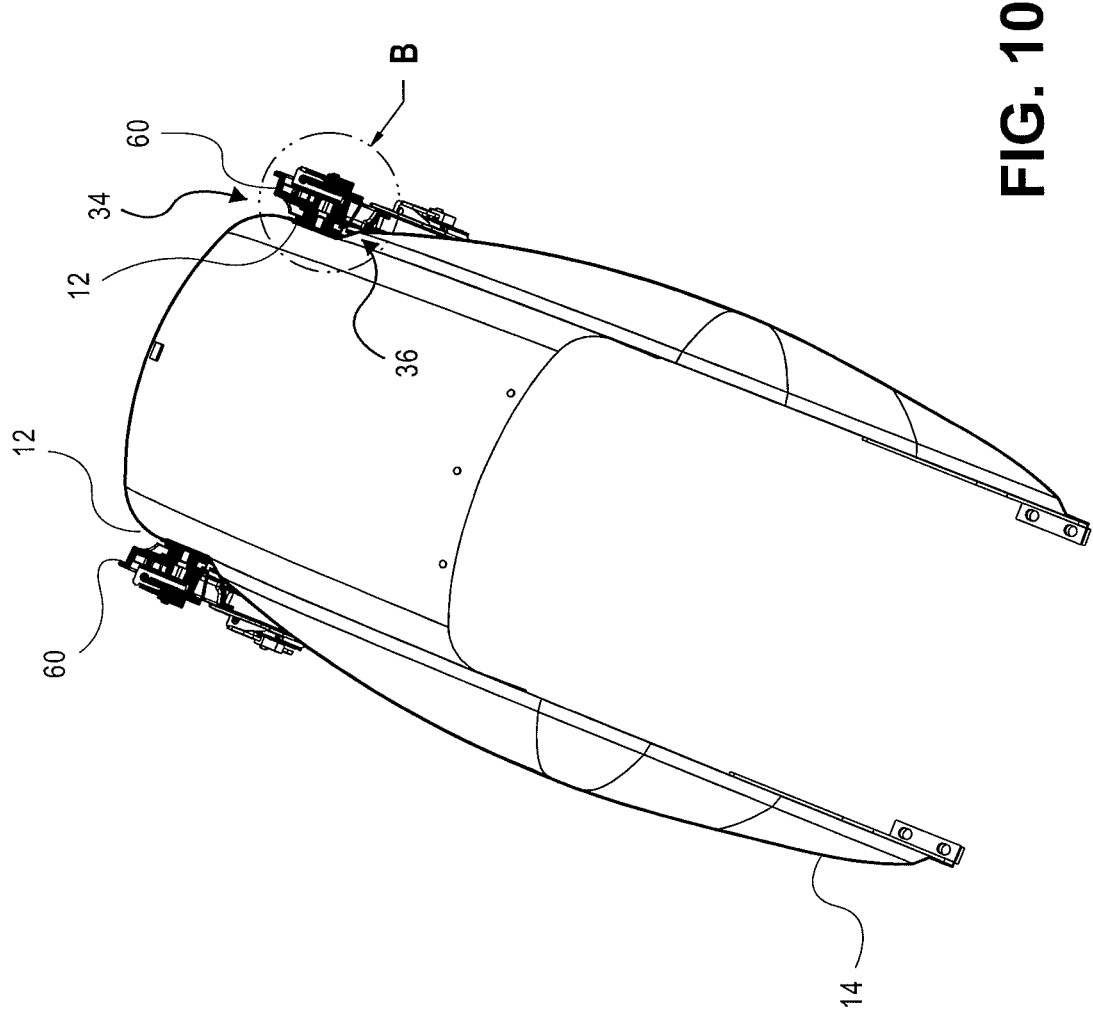
FIG. 10 is a cross-sectional view A-A of the latch releasably secured to the mounting bracket.

FIG. 10 is a cross-sectional view A-A of FIG. 9 of the latch 60 releasably secured to the mounting bracket 12. As shown in FIG. 10, the latch 60 is secured to the mounting bracket 12 from above and below and is in direct contact along an outer face of the mounting bracket 12. Also shown in FIG. 10 is another latch 60 mounted to a second mounting bracket 12 disposed on the other side of the fender 14.

Figure 11:
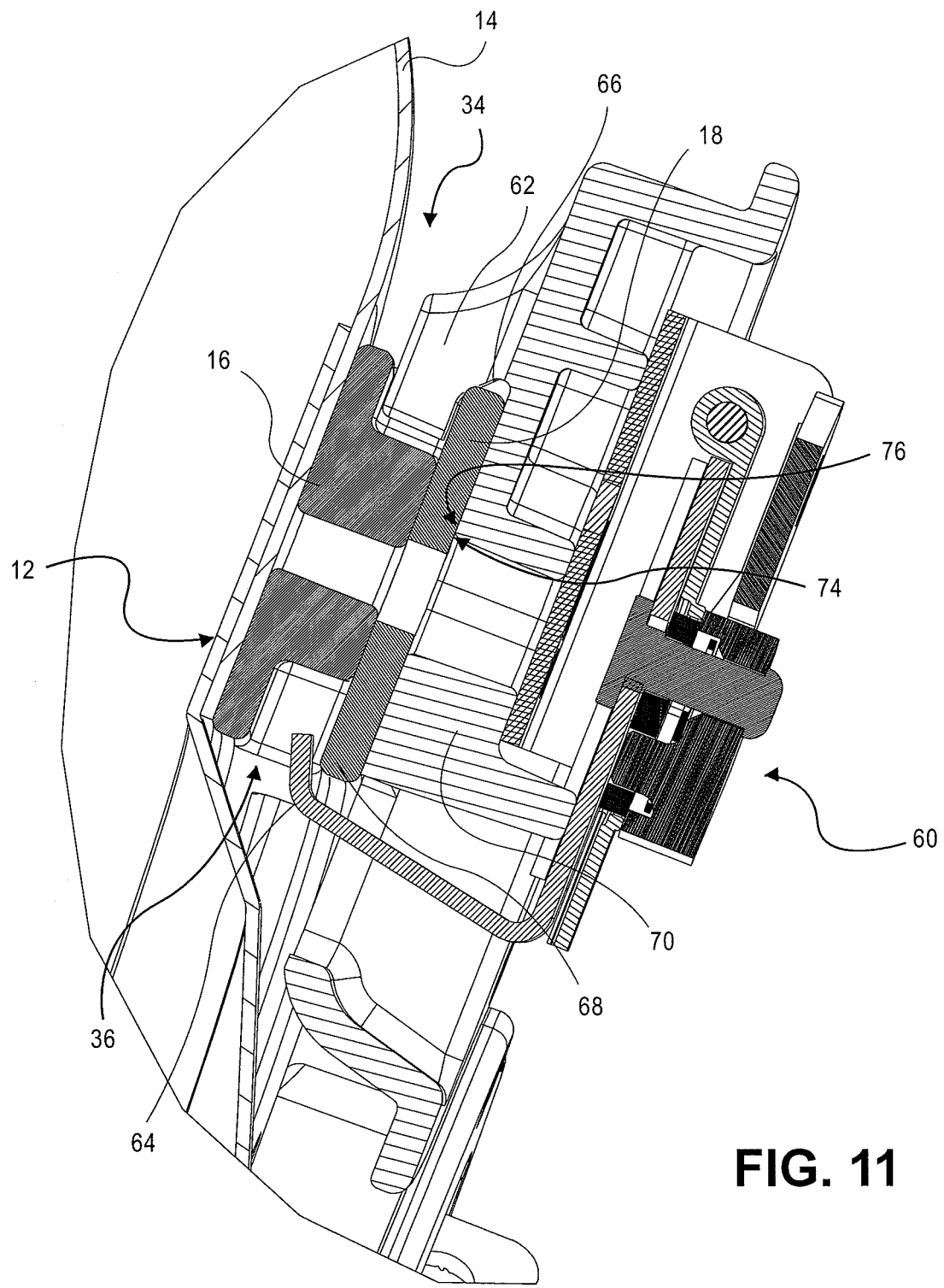
FIG. 11 is a detail view B of the latch releasably secured to the mounting bracket.

FIG. 11 is a detail view B shown in FIG. 10 of the latch 60 releasably secured to the mounting bracket 12. As shown in FIG. 11, the latch 60 includes an upper jaw 62 and lower jaw 64. The upper jaw 62 is configured to engage an upper edge 66 of the cover plate 16. In a particular example, the upper jaw 62 is fixed relative to the latch 60 and includes an undercut portion having a shape that corresponds to the upper edge 66. The lower jaw 64 is configured to engage a lower edge 68 of the cover plate 16. For example, as described herein, the lower jaw 64 may be configured to rotate and/or slide relative to a latch body 70. In a particular example, the lower jaw 64 is operable to slide towards the upper jaw 62 and capture the cover plate 18 therebetween. In addition, this sliding and/or clamping action of the upper and lower jaws 62/64 is configured to urge a back surface 74 of the latch body 70 towards an outer surface 76 of the cover plate 18.

Figure 12:
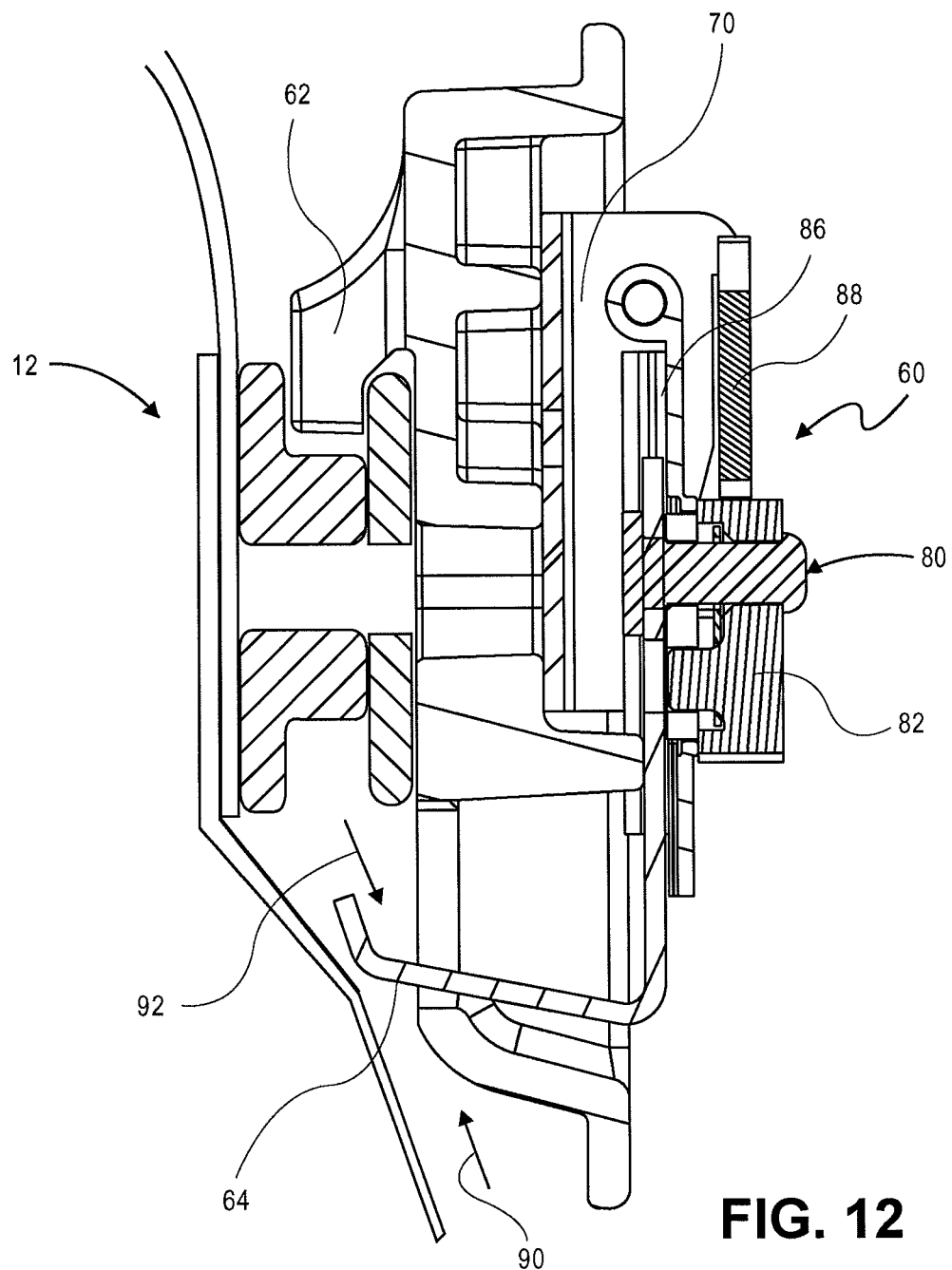
FIG. 12 is a detail view B of the latch partially released from the mounting bracket.

FIG. 12 is a detail view B of the latch 60 partially released from the mounting bracket 12. In an embodiment of the invention, the latch 60 is a rotary latch that includes a post 80. The post 80 includes a first shaft 82 configured to engage the lower jaw 64 and a second shaft 84 configured to engage a jaw base 86. The post 80 includes a handle 88 to provide a gripping surface to rotate the post 80. In response to rotating the post 80 in a first direction, the lower jaw 64 is urged to slide relatively towards the jaw base 86, as shown in direction 90. In response to rotating the post 80 in a second direction, the lower jaw is urged to slide relatively away from the jaw base 86, as shown in direction 92. In this manner, the latch 60 is secured to and released from the mounting bracket 12.

Figure 13:
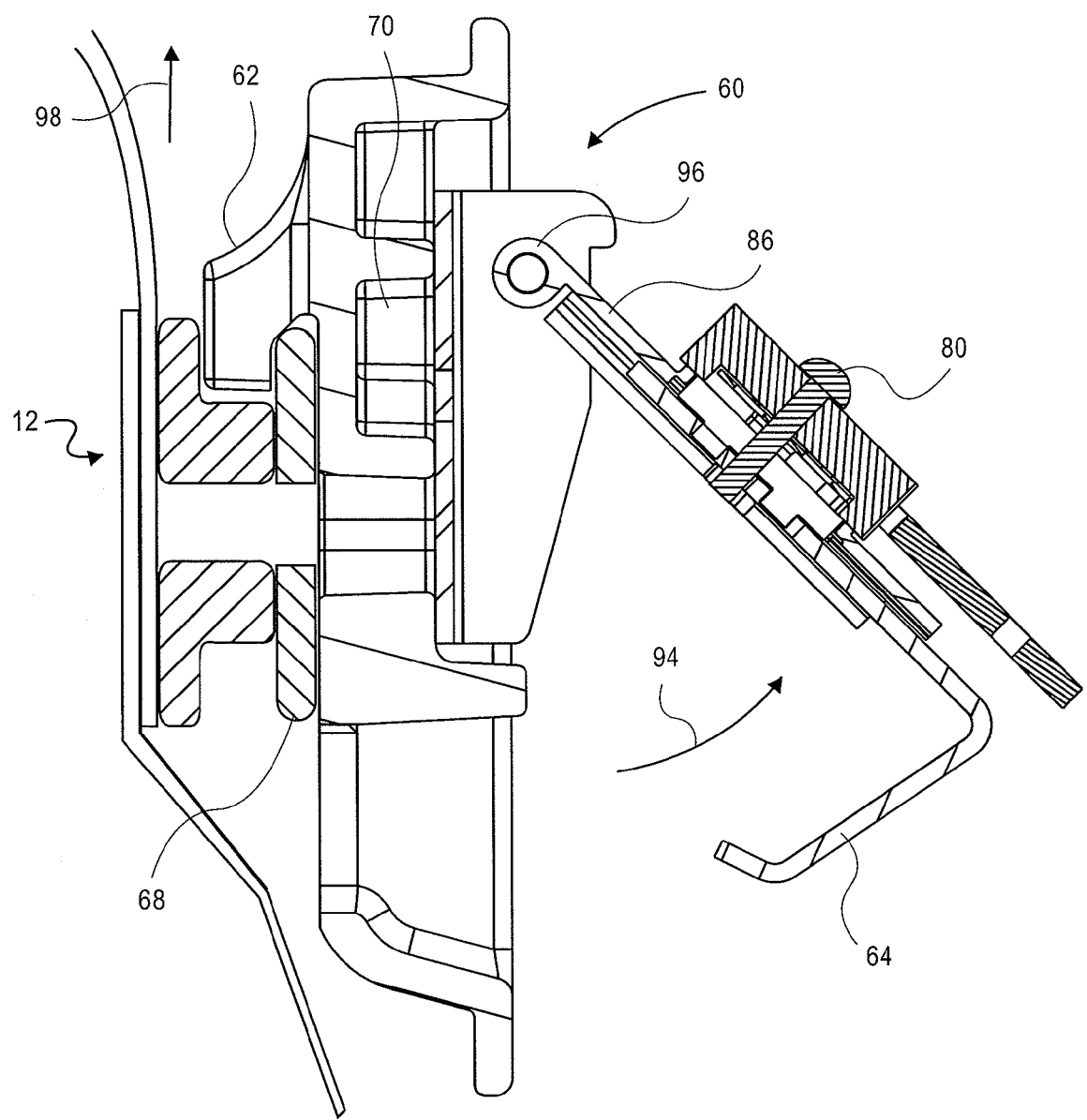
FIG. 13 is a detail view B of the latch released from the mounting bracket.

FIG. 13 is a detail view B of the latch 60 released from the mounting bracket 12. As shown in FIG. 13, the lower jaw 64 may pivot in direction 94 away from the latch body 70 via a hinge 96. Once the lower jaw 64 has been repositioned out from under the lower edge 68, the latch 60 may be free to be removed up and off the mounting bracket 12 as indicated by direction 98.

Figure 14:
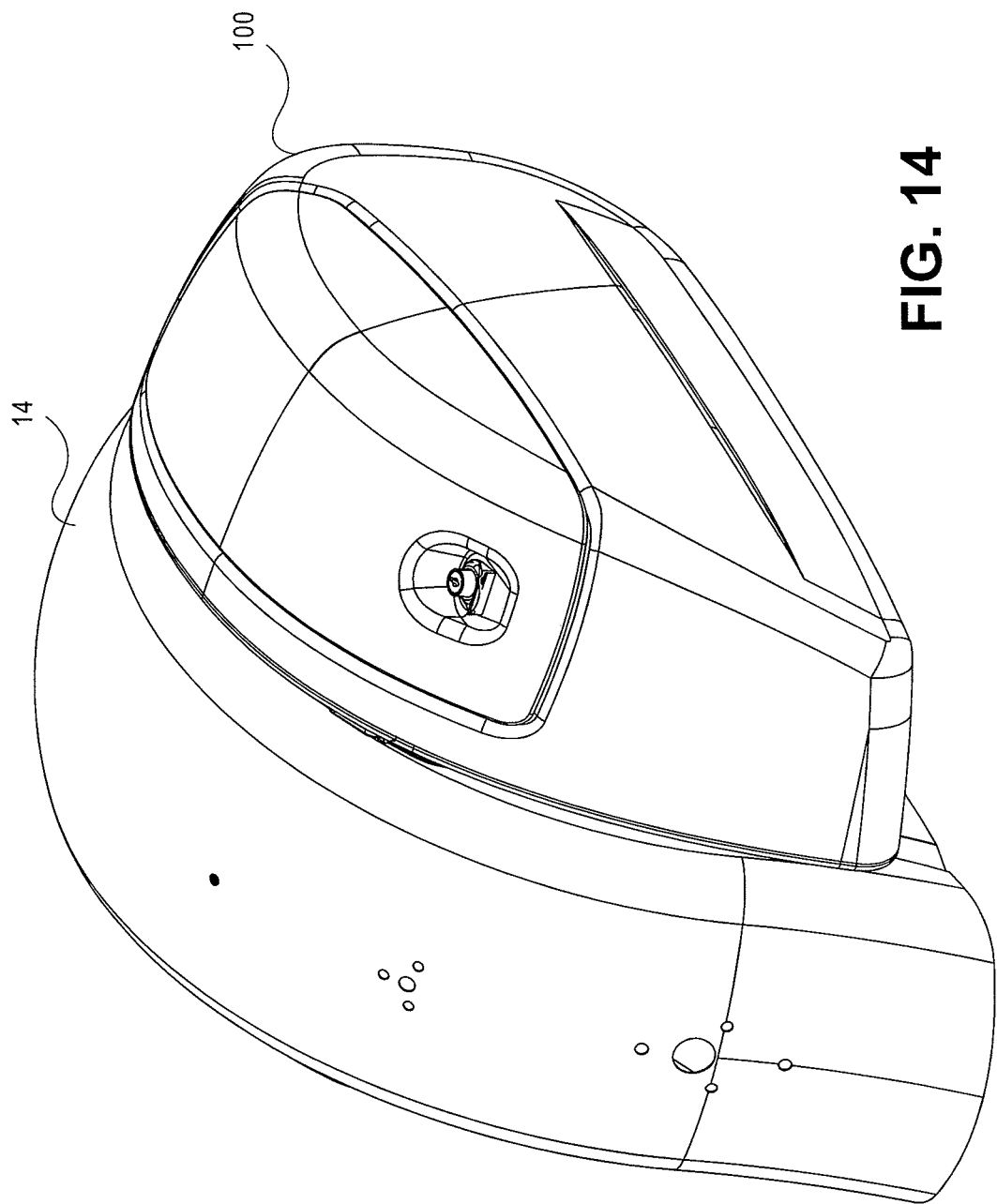
FIG. 14 is a perspective view of a saddlebag that is suitable for use with embodiments of the invention.
Figure 15:
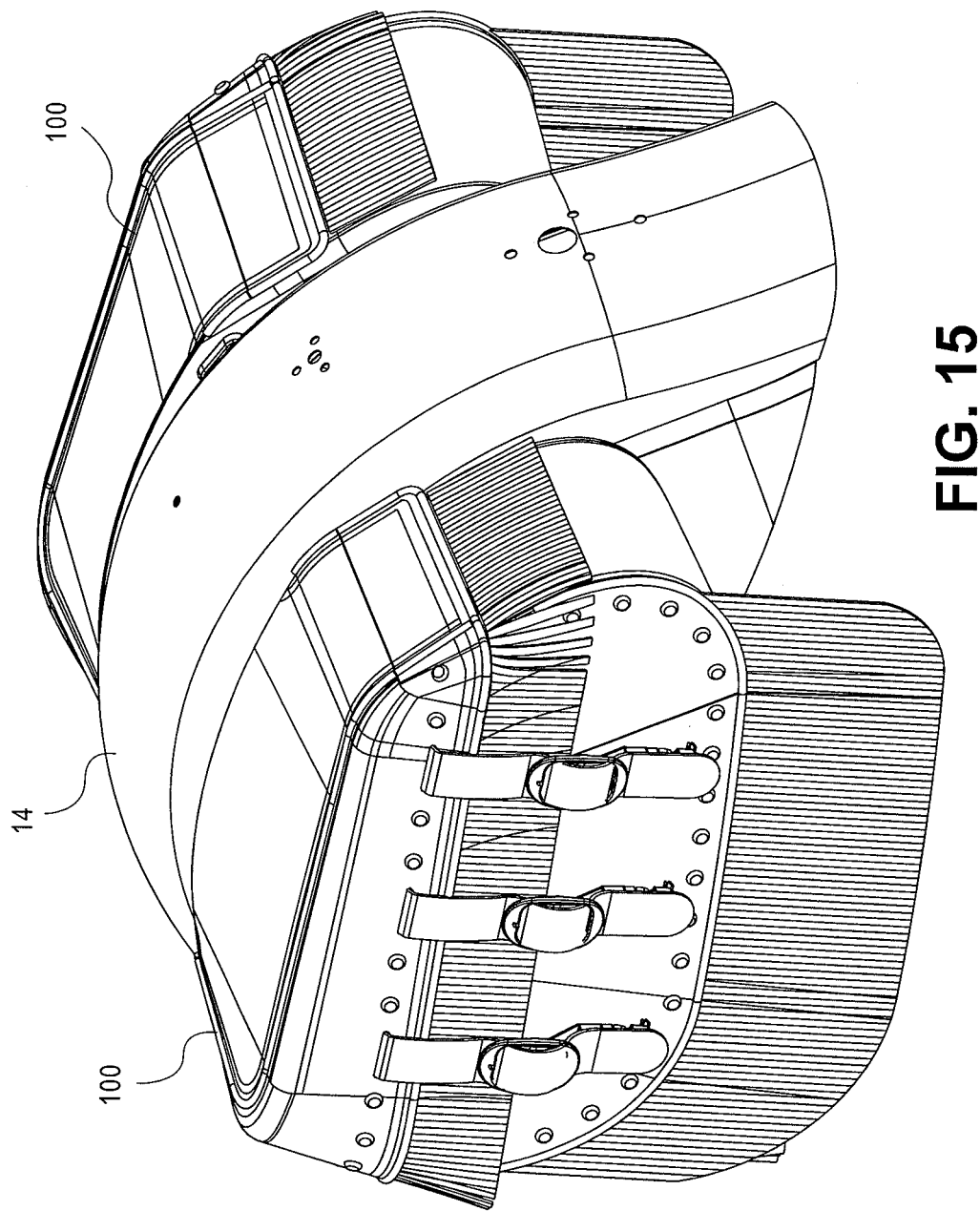
FIG. 15 is a perspective view of another saddlebag that is suitable for use with embodiments of the invention.

FIG. 14 is a perspective view of a saddlebag 100 that is suitable for use with embodiments of the invention. As shown in FIG. 14, the saddlebag 100 may be attached to the fender 14. The saddlebag 16 may be a leather saddlebag or one formed of composite material. If the saddlebag is leather it is referred to as a soft saddlebag, and if it is formed of composite material it is referred to as a hard saddlebag. In the example embodiment shown in FIG. 14, a hard saddlebag 100 is shown. In another example shown in FIG. 15, a pair of the saddlebags 100 are illustrated. The saddlebags 100 shown in FIG. 15 are examples of soft saddlebags.

Figure 16:
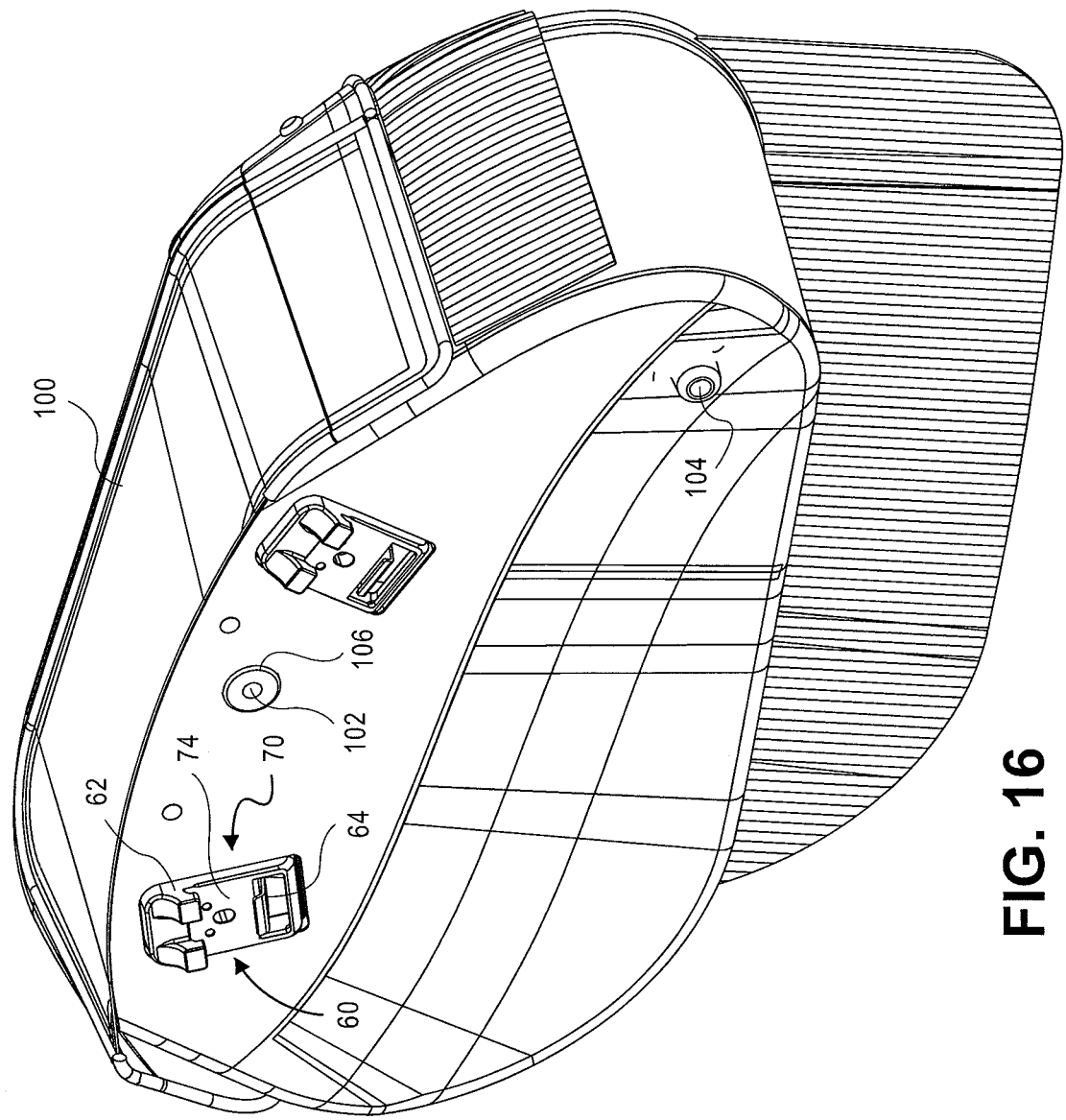
FIG. 16 is a perspective view of the saddlebag showing a side of the saddlebag configured to attach to the mounting bracket.

In the following FIGS. 16 to 18, the various components of the saddlebag 100 and mounting bracket 12 are shown assembled in a reverse order, to more clearly illustrate the inter-workings of the components. FIG. 16 is a perspective view of the saddlebag 100 showing a side of the saddlebag configured to attach to the mounting bracket 12 (Not shown). As shown in FIG. 16, the upper and lower jaws 62 and 64 and the back surface 74 of the latch 60 may protrude from the saddlebag 100 to facilitate attaching the saddlebag 100 to the mounting bracket 12. In addition, the saddlebag 100 may include a retaining pin hole 102 and a standoff 104. The retaining pin hole 102 is configured to provide a passage for the retaining pin 52 (Shown in FIG. 4) from an interior of the saddlebag 100 to access the retaining pin holes 48 and 50. To reinforce the saddlebag 100 and/or the retaining pin hole 102, a grommet 106 may be disposed in the saddlebag 100.

The standoff 104 is optionally provided to maintain the saddlebag 100 at a predetermined angle relative to the fender 14, reduce torque applied to the latches 60 and/or mounting brackets 12, reduce chafing between the saddlebag 100 and the fender 14, facilitate airflow between the saddlebag 100 and the fender 14, and/or the like. If present, the standoff 104 may be integrally formed into the saddlebag 100 and/or may be affixed to the saddlebag 100 with an adhesive and/or fastener.

Figure 17:
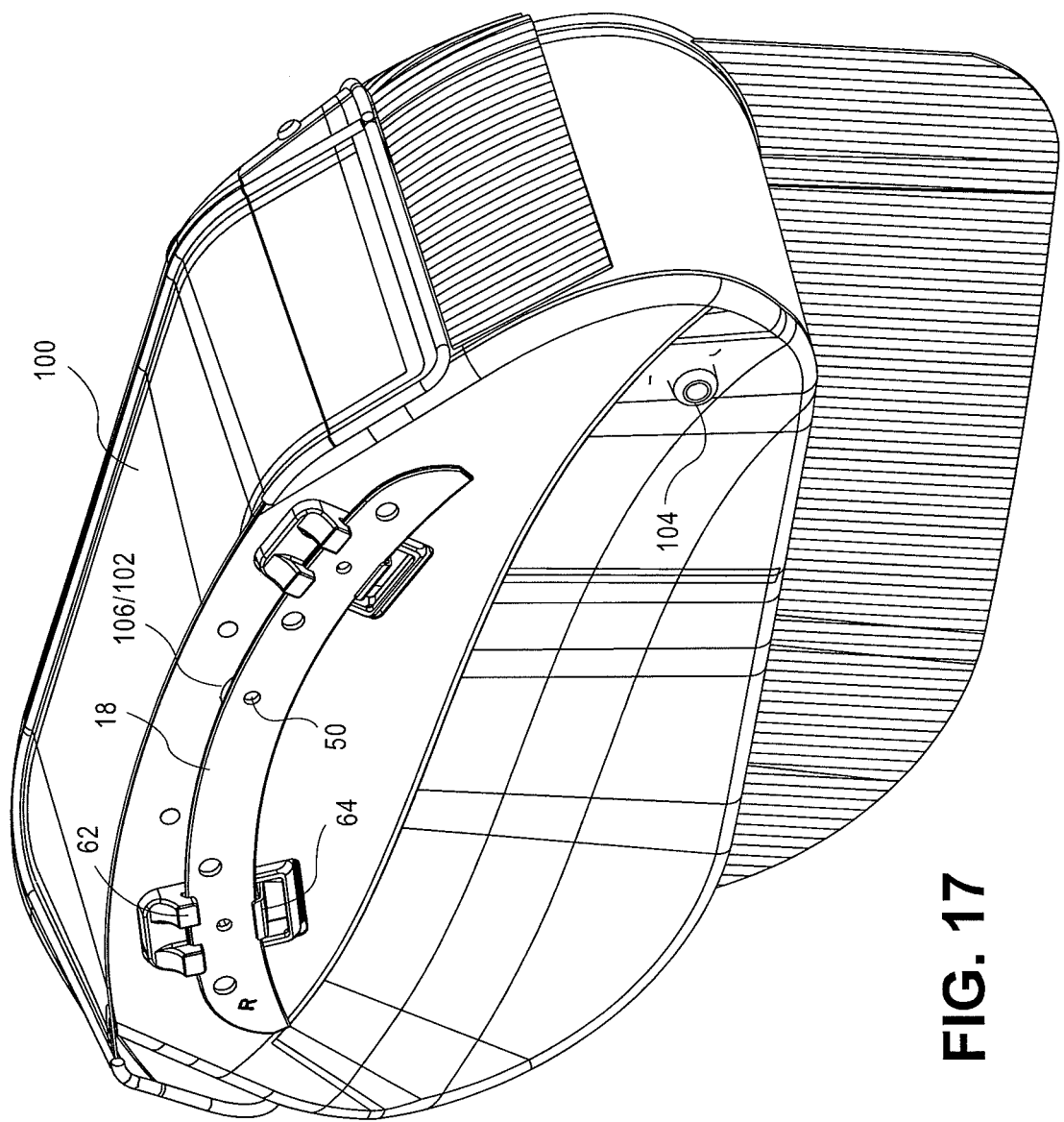
FIG. 17 is a perspective view of the saddlebag releasably attached to a cover plate.

FIG. 17 is a perspective view of the saddlebag 100 releasably attached to the cover plate 18. As shown in FIG. 17, the cover plate 18 is captured between the upper and lower jaws 62 and 64 and the retaining pin hole 50 is disposed in cooperative alignment with the retaining pin hole 102 and the grommet 106.

Figure 18:
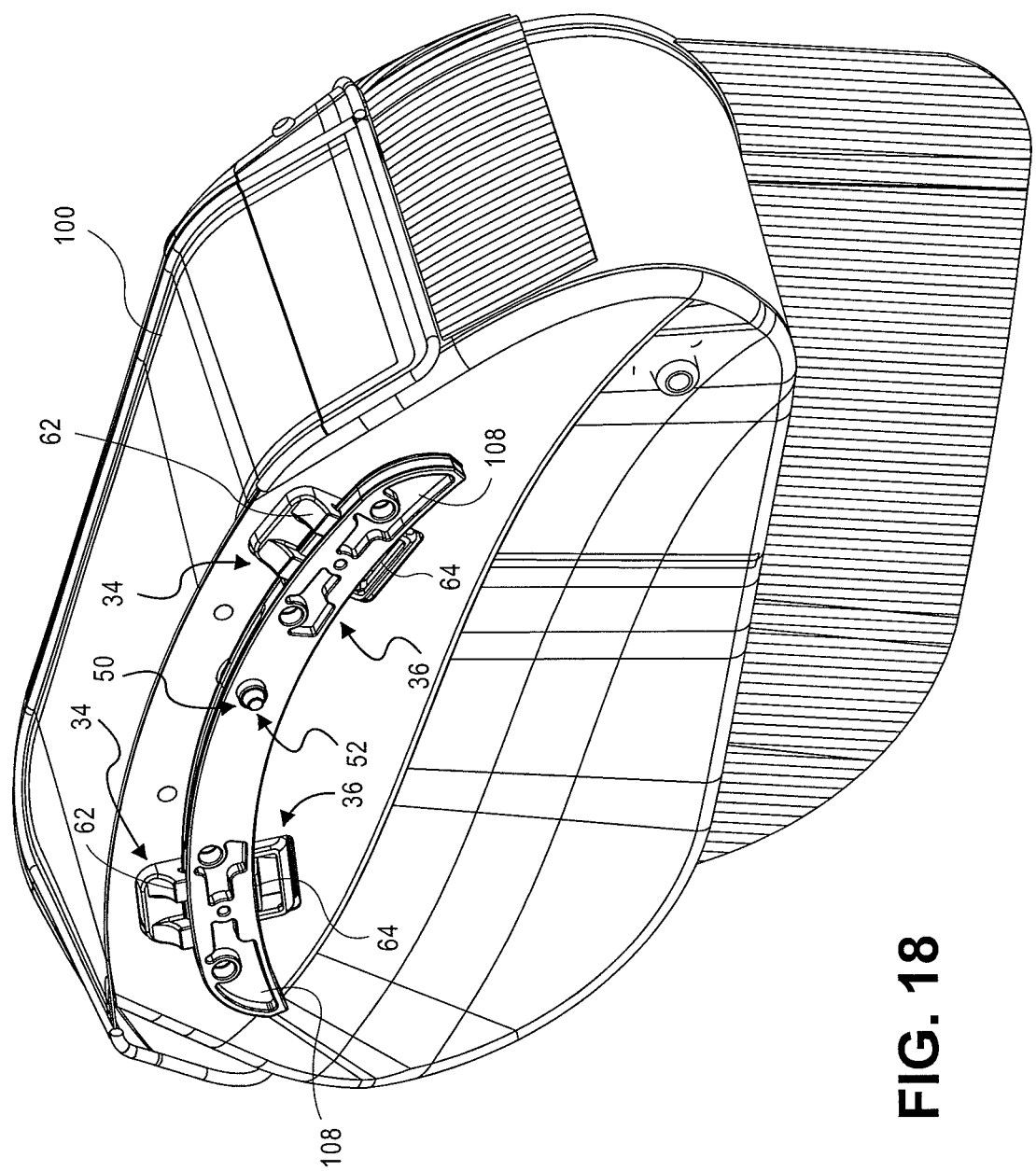
FIG. 18 is a perspective view of the saddlebag releasably attached to the mounting bracket.

FIG. 18 is a perspective view of the saddlebag 100 releasably attached to the mounting bracket 12. As shown in FIG. 18, upper and lower jaws 62 and 64 are disposed, respectively, in the upper and lower recesses 34 and 36. In various embodiments of the invention the retaining pin 52 may engage a pin receptacle or may protrude from the retaining pin hole 50. In this regard, the retaining pin 52 is configured to pass from an interior of the saddlebag 100, through the retaining pin hole 102 (shown in FIG. 16) and through the retaining pin hole 50. A particular example of a suitable retaining pin 52 and/or receptacle includes quarter turn fasteners such as DZUS® manufactured by Southco of Concordville, Pa. 19331, U.S.A. Furthermore, if an accessory having a mounting tab 44 and/or retaining pin hole 48 is attached to the mounting bracket 12, the retaining pin 52 is operable to pass therethrough as well to releasably secure the accessory such as the backrest 42 or luggage rack 58, for example.

Optionally, the base plate 16 includes a negative impression 108 of the standoffs 38. The negative impression may be formed as a result of a forging or casting fabrication process or may be machined or otherwise formed. If included, the negative impression may facilitate a reduction in weight and/or material cost.

Figure 19:
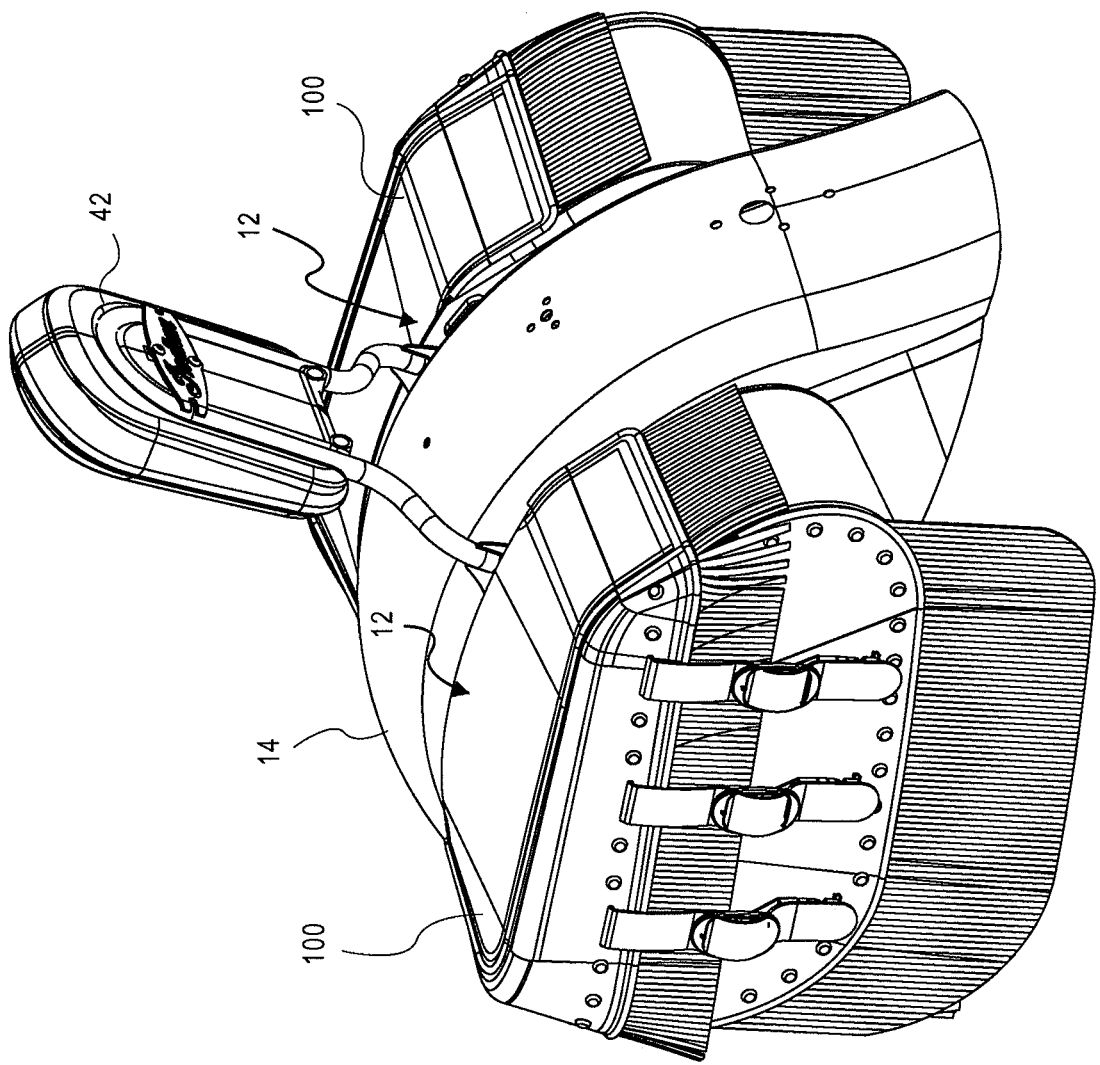
FIG. 19 is a perspective view of a backrest a the pair of the saddlebags detachably secured to the mounting brackets.

FIG. 19 is a perspective view of the backrest 42 and the pair of the saddlebags 100 detachably secured to the mounting brackets 12. As shown in FIG. 19, the accessories such as the backrest 42 and saddlebags 100 nest upon the fender 14 without overlapping or otherwise interfering with one another.

Figure 20:
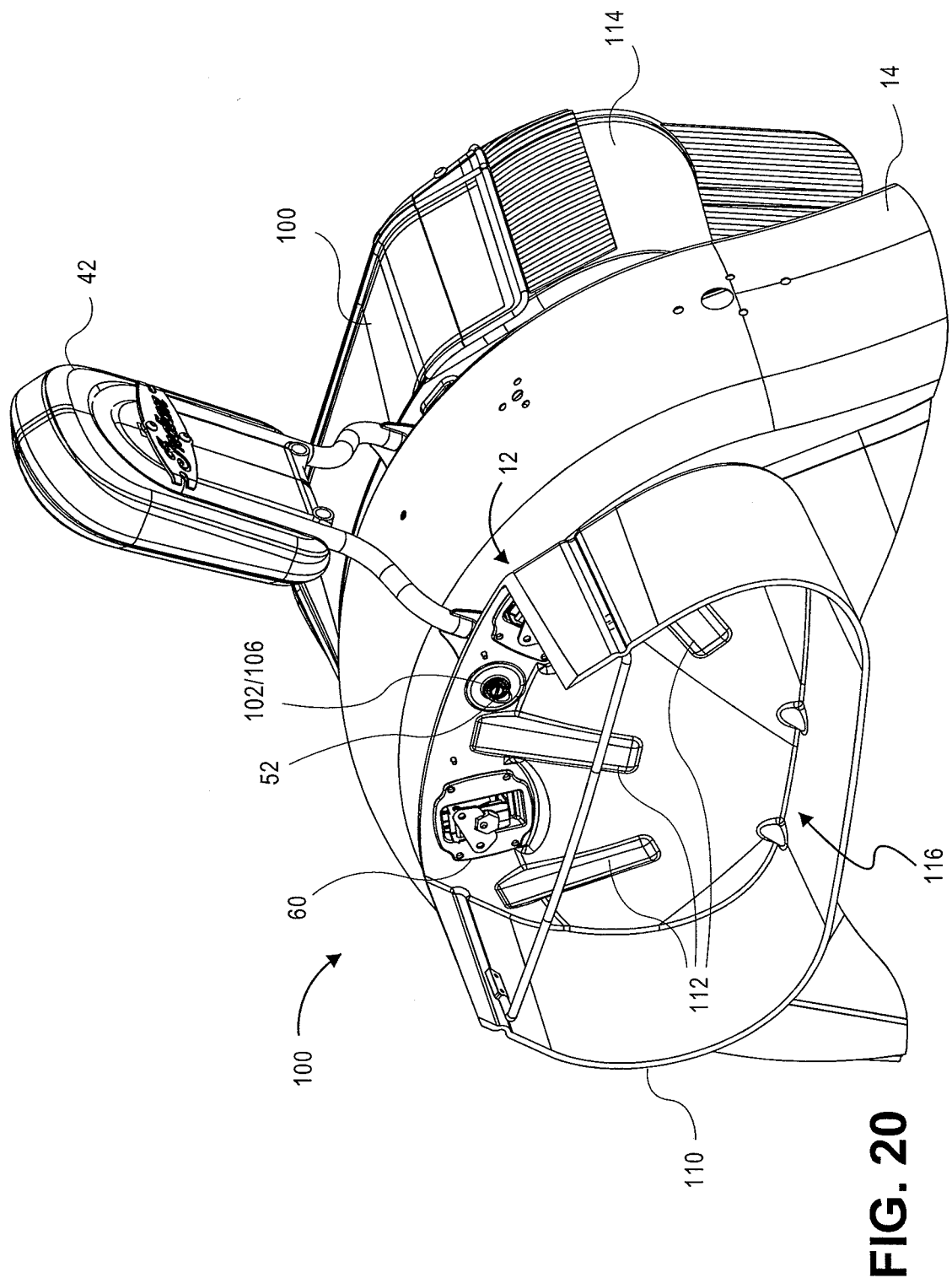
FIG. 20 is a perspective view of the backrest and the pair of the saddlebags detachably secured to the mounting brackets.

FIG. 20 is a perspective view of the backrest 42 and the pair of the saddlebags 100 detachably secured to the mounting brackets 12. As shown in FIG. 20, the saddlebag 100 includes an internal frame 110 and one or more supports 112. Note, an outer covering 114 has been removed for clarity. In general, the internal frame 110 and/or supports 112 provide structure to the saddle bag 100. For example, the internal frame 110 and/or supports 112 are configured to maintain an overall shape of the saddle bag 100. More particularly, the internal frame 110 is configured to provide rigidity for the sidewalls, bottom panel, and/or top. The supports 112 are configured to provide further support to the sidewall proximal to the fender 14. More particularly, the supports 112 may provide structural rigidity to the sidewall proximal to the fender 14 in order to reduce contact or chafing, maintain a predetermined orientation relative to the fender 14, and/or aid in distributing weight placed in the saddlebag 100.

In addition, the retaining pin 52 is shown mated to the retaining pin hole 102 in the grommet 106. It is an advantage of this and other embodiments of the invention that the retaining pin 52 is readily accessed from within an inner compartment 116 of the saddlebag and yet, the retaining pin 52 is not visible while the saddlebag 100 is closed. In addition, other components of the mounting system such as the mounting bracket 12 and latches 60 are covered or otherwise inconspicuously located. This "clean look" or de-emphasis of the mounting hardware provides a visually appealing outward appearance.

Figure 21:
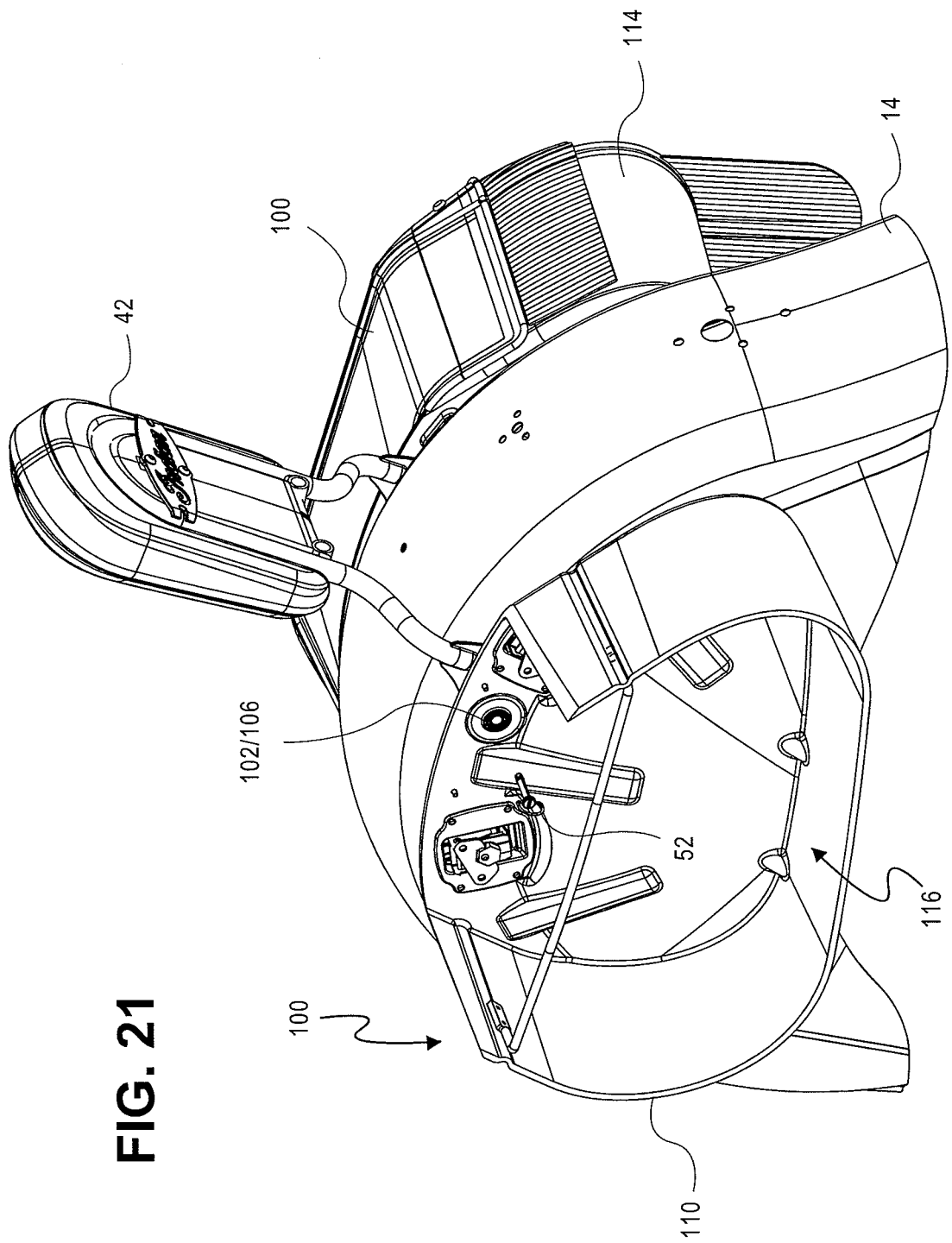
FIG. 21 is a perspective view of an initial step during the removal of the backrest from the mounting brackets.

FIG. 21 is a perspective view of an initial step during the removal of the backrest 42 from the mounting brackets 12. (Note again, the outer covering 114 has been removed for clarity.) As shown in FIG. 21, the retaining pin 52 may be removed from the retaining pin hole 102 without the need to remove the saddlebag 100. This ability to add or remove the backrest 42, the luggage rack 58, and/or the like is a particular advantage of this and other embodiments of the invention. With the retaining pin 52 removed, the backrest 42 may be removed.

Figure 22:
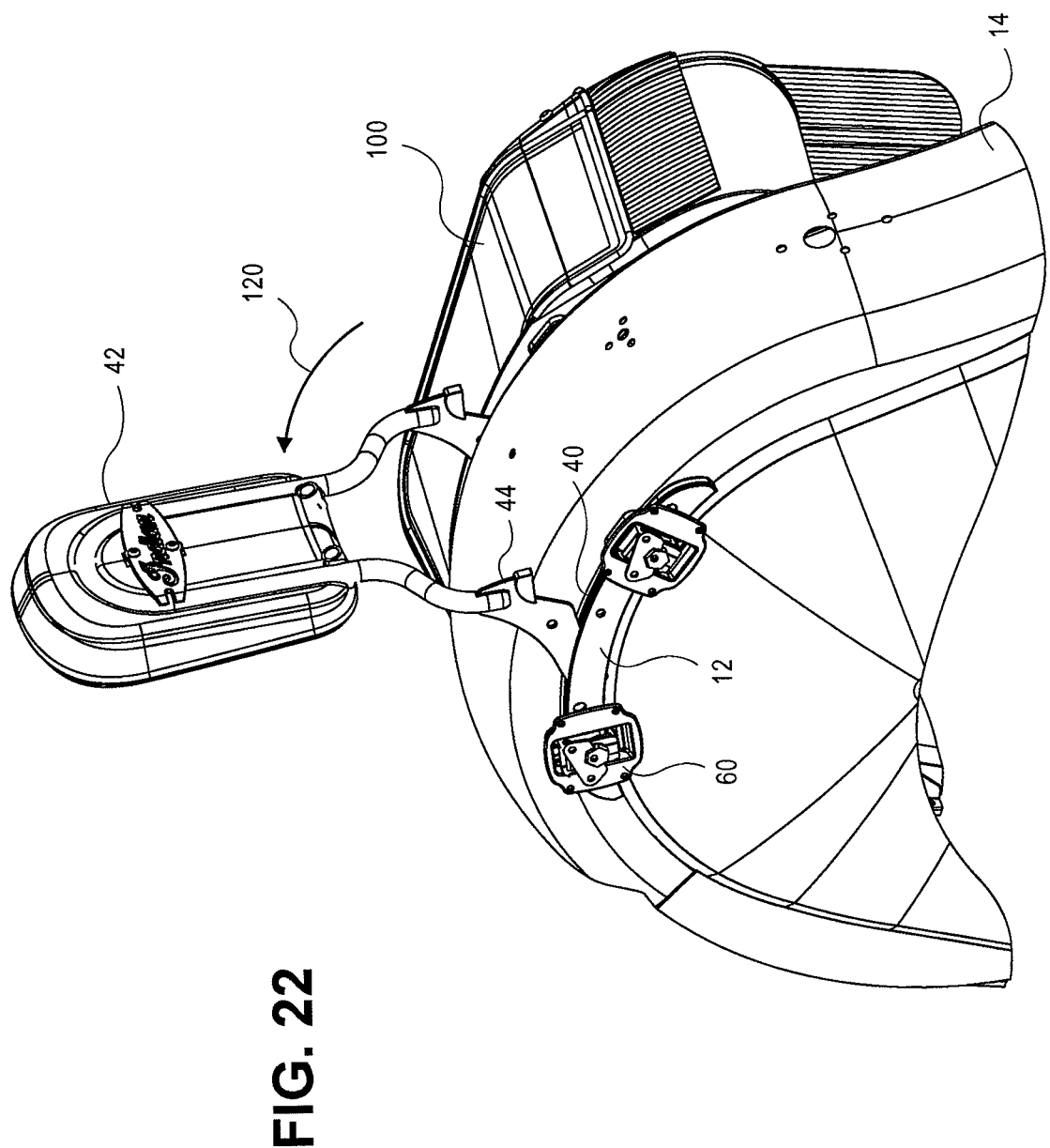
FIG. 22 is a perspective view of an intermediate step during the removal of the backrest.

FIG. 22 is a perspective view of an intermediate step during the removal of the backrest 42. (Note, one of the saddlebags 100 has been removed for clarity.) As shown in FIG. 22, in response to removal of one or more retaining pins 52, the backrest 42 may be urged in direction 120 and the mounting tab 44 may pivot up and out of the mounting slot 40.

Figure 23:
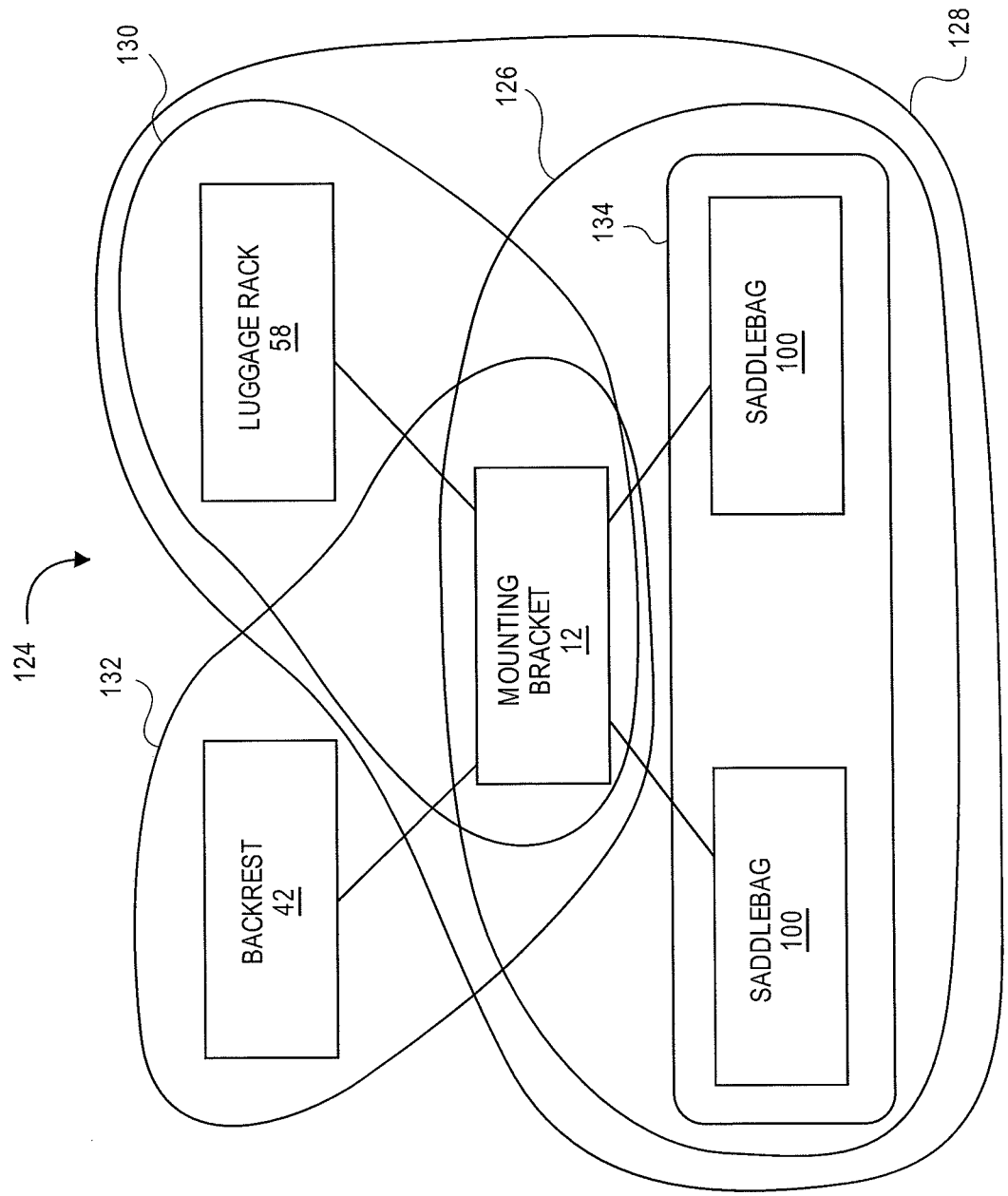
FIG. 23 is a system diagram of a mounting system according to an embodiment of the invention.

FIG. 23 is a system diagram of a mounting system 124 according to an embodiment of the invention. As shown in FIG. 23, the mounting system 124 includes the mounting bracket 12 and one or more of the backrest 42, luggage rack 58, and one or more saddlebag 100. These components are configured to function together, interchangeably, to provide a user with flexibility to customize the system 124. To further provide flexibility, the system 124 may include one or more kits 126 to 134, for example. In the particular examples shown, the kit 126 may include the mounting bracket 12 and a pair of the saddlebags 100. In addition, the kit 126 and other kits that include the mounting bracket 12 may also include mounting hardware such as the fasteners 20, backer plate 26, and/or nuts 28 as shown in FIG. 3. The kit 126 may also include either hard, or soft sided saddlebags. In another example, the kit 130 may include the mounting bracket 12 and luggage rack 58. If a user wishes to customize the motorcycle 10 with only the luggage rack 58, the kit 130 may provide a cost effective solution as opposed to purchasing and installing the kit 128. If the user later decides to add the saddlebags 100, the kit 134 may be purchased and installed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A mounting system for removably mounting an accessory on a fender of a motorcycle, the mounting system comprising:
   a mounting bracket configured to be mounted on the fender, the mounting bracket comprising:
      a base plate disposed upon the fender; a cover plate configured to cover a portion of the base plate;
      a standoff disposed between the base plate and the cover plate;
      a mounting slot disposed between the base plate and the cover plate, the mounting slot being generated by the standoff being disposed between the base plate and cover plate;
      an upper recess disposed at an upper edge of the mounting bracket between the base plate and the cover plate; and
      a lower recess disposed at a lower edge of the mounting bracket between the base plate and the cover plate; a mounting tab configured to mate with the mounting slot, the mounting tab being affixed to a first accessory; and
   a latch affixed to a second accessory, the latch comprising:
      an upper jaw configured to mate with the upper recess; and
      a lower jaw configured to mate with the lower recess.

2. The mounting system according to claim 1, further comprising: a second standoff, wherein the standoff and the second standoff are disposed at opposite ends of the mounting bracket and the mounting slot if disposed between the standoff and the second standoff.

3. The mounting system according to claim 1, further comprising: a retaining pin hole disposed in the mounting bracket; and a retaining pin configured to mate with the retaining pin hole.

4. The mounting system according to claim 1, further comprising: a compression spring disposed on the mounting tab.

5. The mounting system according to claim 1, further comprising: a mounting stud disposed in the mounting slot.

6. The mounting system according to claim 5, further comprising: a fork disposed at an end of the mounting tab, the fork being configured to engage the mounting stud.

7. The mounting system according to claim 6, further comprising: a bushing disposed on the mounting stud and captured by the mounting stud.

8. The mounting system according to claim 1, wherein the first accessory is a backrest.

9. The mounting system according to claim 1, further comprising a third accessory affixed to the mounting tab, the third accessory comprising a luggage rack.

10. The mounting system according to claim 1, wherein the second accessory is a saddlebag.

11. The mounting bracket according to claim 1 further comprising: a plurality of fasteners to fasten the mounting bracket to the fender.

\* \* \* \* \*